US008110609B2

(12) United States Patent
Determan et al.

(10) Patent No.: US 8,110,609 B2
(45) Date of Patent: Feb. 7, 2012

(54) COPOLYETHERESTERS DERIVED FROM POLYETHYLENE TEREPHTHALATE

(75) Inventors: Michael Determan, St. Paul, MN (US); Ganesh Kannan, Evansville, IN (US); Kenneth Frederick Miller, Posey, IN (US); Dhaval Shah, Evansville, IN (US)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 12/852,668

(22) Filed: Aug. 9, 2010

(65) Prior Publication Data

US 2010/0298498 A1    Nov. 25, 2010

Related U.S. Application Data

(62) Division of application No. 11/627,745, filed on Jan. 26, 2007, now Pat. No. 7,795,320.

(60) Provisional application No. 60/763,107, filed on Jan. 27, 2006, provisional application No. 60/820,450, filed on Jul. 26, 2006.

(51) Int. Cl.
*C08J 11/04* (2006.01)

(52) U.S. Cl. ........... 521/48; 521/40; 521/48.5; 528/271; 528/272; 528/277; 528/278; 528/300; 528/302; 528/304; 528/305; 528/306; 528/308; 528/308.1; 528/308.2; 528/308.3; 528/308.6; 528/480

(58) Field of Classification Search ............ 521/40, 521/40.5, 41, 42, 42.5, 46, 47, 48, 48.5; 528/271, 528/272, 277, 295.3, 296, 302, 303, 304, 528/305, 306, 308.1, 308.2, 308.3, 308.6, 528/480; 525/436, 437; 264/176.1, 219
See application file for complete search history.

(56) References Cited

U.S. PATENT DOCUMENTS

| | | |
|---|---|---|
| 2,465,319 A | 3/1949 | Whinfield et al. |
| 2,720,502 A | 10/1955 | Caldwell |
| 2,727,881 A | 12/1955 | Caldwell et al. |
| 2,822,348 A | 2/1958 | Haslam |
| 3,047,539 A | 7/1962 | Pengilly |
| 3,671,487 A | 6/1972 | Abolins |
| 3,701,755 A | 10/1972 | Sumoto et al. |
| 3,855,277 A | 12/1974 | Fox |
| 3,864,428 A | 2/1975 | Nakamura et al. |
| 3,907,868 A | 9/1975 | Currie et al. |
| 3,907,926 A | 9/1975 | Brown et al. |
| 3,909,926 A | 10/1975 | Hutson |
| 3,953,394 A | 4/1976 | Fox et al. |
| 4,011,285 A | 3/1977 | Seymour et al. |
| 4,096,156 A | 6/1978 | Freudenberger et al. |
| 4,128,526 A | 12/1978 | Borman |
| 4,154,775 A | 5/1979 | Axelrod |
| 4,161,498 A | 7/1979 | Bopp |
| 4,264,487 A | 4/1981 | Fromuth et al. |
| 4,355,155 A | 10/1982 | Nelsen |
| 4,469,851 A | 9/1984 | Charles et al. |
| 4,579,884 A | 4/1986 | Liu |
| 4,598,117 A | 7/1986 | Liu et al. |
| 4,983,660 A | 1/1991 | Yoshida et al. |
| 5,122,551 A | 6/1992 | Gallucci et al. |
| 5,221,704 A | 6/1993 | Shimotsuma et al. |
| 5,266,601 A | 11/1993 | Kyber et al. |
| 5,326,806 A | 7/1994 | Yokoshima et al. |
| 5,413,681 A | 5/1995 | Tustin et al. |
| 5,451,611 A | 9/1995 | Chilukuri et al. |
| 5,559,159 A | 9/1996 | Sublett et al. |
| 5,882,780 A | 3/1999 | Yamamura et al. |
| 6,162,837 A | 12/2000 | Gerking et al. |
| 6,255,371 B1 | 7/2001 | Schlosser et al. |
| 6,410,607 B1 | 6/2002 | Ekart et al. |

(Continued)

FOREIGN PATENT DOCUMENTS

| | | |
|---|---|---|
| EP | 0135493 A1 | 3/1985 |
| EP | 0683201 A1 | 11/1995 |
| GB | 1500577 | 2/1978 |
| JP | 2000-256472 A | 9/2000 |
| JP | 2000-256920 A | 9/2000 |
| JP | 2005-89572 A | 5/2005 |
| KR | 2001-0083551 A1 | 9/2001 |
| WO | 03/066704 A1 | 8/2003 |
| WO | 2007/111774 A2 | 10/2007 |
| WO | 2007111774 A2 | 10/2007 |

OTHER PUBLICATIONS

International Search Report, International Application No. PCT/US07/002197; International Filing Date: Jan. 26, 2007; Date of Mailing: Jun. 19, 2007; 5 pages.

(Continued)

*Primary Examiner* — James J Seidleck
*Assistant Examiner* — Frances Tischler
(74) *Attorney, Agent, or Firm* — Cantor Colburn LLP; Diderico van Eyl

(57) ABSTRACT

The invention relates to a composition comprising a modified, random copolyetherester containing a modified, random polytrimethylene terephthalate copolymer block that is derived from a polyethylene terephthalate component selected from the group consisting of polyethylene terephthalate and polyethylene terephthalate copolymers and combinations thereof; and contains at least one residue derived from the polyethylene terephthalate component; and a polyalkylene oxide copolymer block that contains polyalkylene oxide and at least one residue derived from the polyethylene terephthalate component. The composition has a modulus of elasticity that is at least 80%, as compared to the modulus of elasticity of a copolyetherester derived from (1) polytrimethylene terephthalate derived from a monomer component selected from the group consisting of terephthalic acid, isophthalic acid, alkyl esters of terephthalic acid, hydroxyalkyl esters of terephthalic acid, alkyl esters of isophthalic acid, 1,3-propane diol, (2) polyalkylene oxide glycol, and (3) combinations thereof.

48 Claims, No Drawings

U.S. PATENT DOCUMENTS

| | | |
|---|---|---|
| 6,515,044 B1 | 2/2003 | Idel et al. |
| 6,518,322 B1 | 2/2003 | West |
| 6,599,625 B2 * | 7/2003 | Goldfinger et al. ........... 428/365 |
| 6,794,463 B2 | 9/2004 | Aramaki et al. |
| 6,887,909 B2 | 5/2005 | Kawamura et al. |
| 6,927,275 B2 | 8/2005 | Hirokane et al. |
| 7,179,869 B2 | 2/2007 | Hirokane et al. |
| 7,183,362 B2 | 2/2007 | Hirokane et al. |
| 7,388,067 B2 | 6/2008 | Leemans et al. |
| 7,462,649 B2 | 12/2008 | Nakao et al. |
| 2002/0012807 A1 | 1/2002 | Kurian et al. |
| 2007/0244242 A1 | 10/2007 | Agarwal et al. |

OTHER PUBLICATIONS

International Search Report, International Application No. PCT/US07/074211; International Filing Date: Nov. 9, 2006; Date of Mailing: Mar. 6, 2007, 4 pages.

Written Opinion of the International Searching Authority, International Application No. PCT/US07/074211; International Filing Date: Nov. 9, 2006; Date of Mailing: Mar. 6, 2007, 6 pages.

S.H. Mansour et al.,"Depolymerization of Poly(ethylene terephthalate) Waste Using 1, 4-Butanediol and Triethylene Glycol," Journal of Elastomers and Plastics; Apr. 2003, pp. 133-147, vol. 35, Sage Publications.

* cited by examiner

COPOLYETHERESTERS DERIVED FROM POLYETHYLENE TEREPHTHALATE

CROSS REFERENCE TO RELATED APPLICATIONS

This application is a divisional application of U.S. patent application Ser. No. 11/627,745 filed Jan. 26, 2007, now U.S. Pat. No. 7,795,320, which claims the benefits of U.S. Provisional Patent Application Ser. No. 60/763,107 filed Jan. 27, 2006, and U.S. Provisional Patent Application Ser. No. 60/820,450 filed Jul. 26, 2006, all of which patent applications are fully incorporated herein by reference.

BACKGROUND OF THE INVENTION

Polyethylene terephthalate (also referred to as "PET") is a polyester of terephthalic acid and ethylene glycol that can be obtained by the polycondensation of dimethyl terephthalate with ethylene glycol, and also terephthalic acid with ethylene glycol or ethylene oxide. PET exists both as an amorphous (transparent) and as a semi-crystalline (opaque and white) thermoplastic material. Generally, it has useful chemical resistance to mineral oils, solvents, and acids but not to bases. Semi-crystalline PET has good strength, ductility, stiffness, and hardness. Amorphous PET has better ductility but less stiffness and hardness. PET is used to make bottles for soft drinks and other household and consumer products. Generally, PET has many uses and several large markets. For this reason, the volume of PET manufactured is large and growing.

Unfortunately, despite recycling efforts, billions of pounds of PET are still dumped into landfills annually all over the world. Other PET that is not reused is incinerated. The PET that is disposed into landfills creates significant waste. The incineration of PET also wastes a significant resource that could be used more effectively.

Copolyetheresters, sometimes referred to as TPEE elastomers, are a special class of elastomeric material. These materials exhibit thermoplastic processability on conventional molding equipment and exhibit the elasticity and resistance to impact and flex-fatigue of conventional cured rubbers. The combination of properties is obtained due to the result of the phase separation between the amorphous polyether segments and the crystalline polyester segments of the copolymer molecule. Because the immiscible segments are copolymerized into a single macromolecular backbone the necessary phase separation that occurs results in discrete domains with dimensions on the order of magnitude of the polymer chain. Thus, the polyether forms soft, amorphous domains that are physically crosslinked by the 'knots' of crystalline, polyester, domains. That is, the amorphous soft blocks provide the elastomeric properties of flexibility and low temperature impact while the presence of the crystalline hard block results in discrete melting points, heat and chemical resistance, and mechanical strength. These materials are also commonly characterized by lower temperature brittleness point than conventional rubbers, resilience, low creep, and very good resistance to oils, fuels, solvents and chemicals.

Thermoplastic compositions containing or based on copolyetheresters and based on polybutylene terephthalate (also referred to as "PBT") in combination with other materials are used in various applications. Although conventional copolyetheresters derived from PBT are useful to many customers, conventional copolyetheresters generally cannot be made from recycle sources of PBT at commercial levels due to the lack of availability of large post-consumer or post-industrial PBT. PET, unlike PBT, is made in much larger quantities and is more easily recovered from consumer wastes. If PET (scrap) materials could be converted to PBT and converted into useful molding compositions, then there would exist a valuable way to effectively increase the use of scrap PET in PBT copolyetheresters and copolyetherester articles. If PET (scrap) materials could be converted to PBT as well as useful copolyetheresters having useful commercial properties, then there would be an effective way to use of post consumer or post-industrial streams. Copolyetheresters made this way would conserve non-renewable hydrocarbon resources and reduce the formation of greenhouse gases, e.g., $CO_2$.

Unfortunately, known solutions for making copolyetheresters do not offer effective ways of using PET scrap that meets today's customer needs. GB1500577 discloses the treatment of scrap PET with an alkylene glycol in an amount equal to from 0.1 to 5 times the weight of the scrap PET. In a preferred embodiment, GB1500577 discloses that these materials are heated at 200 to 250° C. to reflux the glycol for a period of about 8 hours or until the solution becomes clear. The first portion of the glycolization step is preferably carried out at atmospheric pressure and the final portion preferably is carried out at a pressure less than 0.5 mm Hg.

The examples of GB1500577 disclose that "it will be observed that the modulus at various percents elongation for the product produced in accordance with the present invention is quite consistently about half of the modulus of the product produced in accordance with Example 4 of U.S. Pat. No. 3,701,755 when the ingredients are of closely comparable amounts." Example 4 of U.S. Pat. No. 3,701,755 discloses, that "12.17 parts of bis(2-hydroxyethyl) terephthalate, 20.0 parts of PTMG (molecular weight 1800) and 0.014 part (sic) of zince (sic) acetate were charged into a reaction vessel at 200° C. The pressure was gradually reduced while heating, and the polycondensation was conducted under a high vacuum of less than 1 mm Hg for 80 minutes. The obtained copolymer had a melting point of 208° C. . . . " When treated and modified "in ways known for treating segmented copolyetherester elastomers," GB 1500577 discloses that its product is useful in the production of such items as garden hoses, industrial hose material, industrial tires, and tennis shoe soles.

Today's demanding customers' needs often require elastomeric products having excellent performance properties. Although GB1500577 demonstrates a way of using scrap PET, elastomeric polymers that exhibit about half of the modulus of monomer/bis(2-hydroxyethyl) terephthalate-based materials would simply not be acceptable to many customers today. Solutions that require additional modification would not be practical or feasible for manufacturers.

Other attempts directed to using post consumer polyesters such as scrap PET have been directed to methods and devices designed to recover polymers or polymeric components obtained during the depolymerization of polymers. U.S. Pat. No. 6,162,837, for instance, discloses a method and device for recovering linear polyesters, such as PET and PBT, from polyester waste of the most varied form, in a continuous manner, in which undried or not dried-through waste is melted, the polymer chains being hydrolytically degraded by adhering moisture, and in which diol, corresponding to the basic constitutional unit of the polymer, is added to the melt resulting in glycolytic degradation, and the melt so treated is further condensed to the desired degree of polymerization. EP1437377 discloses a process that involves depolymerization reaction of used PET bottles with EG, recovering DMT by ester interchange reaction with methanol, obtaining terephthalic acid by hydrolysis of the recovered DMT, and manufacturing a PET polymer which can be used for manufacturing PET bottles again by using the terephthalic acid. Such solutions do not address the need to make copolyetheresters having suitable commercial properties, e.g., copolyetheresters having properties comparable to copolyetheresters derived from PBT, by the use of PET scrap.

For the foregoing reasons, there is an unmet need to develop improved copolyetheresters derived from PET that exhibit excellent performance properties.

For the foregoing reasons, there is an unmet need to develop improved copolyetheresters derived from PET that retain a significant amount of their properties, as compared to copolyetheresters that are not derived from scrap PET.

For the foregoing reasons, there is an unmet need to develop improved methods for making copolyetheresters derived from PET scrap.

BRIEF DESCRIPTION OF THE INVENTION

The invention relates to a composition comprising a modified, random copolyetherester containing:

(A) a modified, random polybutylene terephthalate copolymer block that is derived from a polyethylene terephthalate component selected from the group consisting of polyethylene terephthalate and polyethylene terephthalate copolymers and combinations thereof; and contains at least one residue derived from the polyethylene terephthalate component; and (B) a polyalkylene oxide copolymer block that is derived from a polyethylene terephthalate component and polyalkylene oxide glycol, and contains polyalkylene oxide and at least one residue derived from the polyethylene terephthalate component;

wherein the composition has a modulus of elasticity that is at least 80%, as compared to the modulus of elasticity of a copolyetherester derived from (1) polybutylene terephthalate derived from a monomer component selected from the group consisting of terephthalic acid, isophthalic acid, alkyl esters of terephthalic acid, hydroalkyl esters of terephthalic acid, alkyl esters of isophthalic acid, 1,4-butanediol, (2) polyalkylene oxide glycol, and (3) combinations thereof. In one embodiment, the invention relates to a process comprising for making a copolyetherester, the process comprising:

(a) depolymerizing a polyethylene terephthalate component selected from the group consisting of polyethylene terephthalate and polyethylene terephthalate copolymers by reacting the (i) polyethylene terephthalate component with (ii) 1,4-butanediol at a pressure that is at least atmospheric pressure in the presence of a catalyst component, under an inert atmosphere conditions sufficient to depolymerize the polyethylene terephthalate component into a molten mixture containing oligomers, 1,4-butanediol, ethylene glycol, and mixtures thereof;

wherein the polyethylene terephthalate component and the diol are combined in the liquid phase under agitation and the diol is refluxed back into the reactor; and (b) agitating the molten mixture under subatmospheric pressure and removing excess diol, ethylene glycol, tetrahydrofuran;

wherein polyalkylene oxide is added during the process in an amount and under conditions that are sufficient to form the copolyetherester.

In another embodiment, our invention relates to a process for making any of our copolyetheresters by a process that involves:

(a) depolymerizing, a polyethylene terephthalate component selected from the group consisting of polyethylene terephthalate and polyethylene terephthalate copolymers by agitating the polyethylene terephthalate component with member selected from the group consisting of ethylene glycol, 1,3 propane diol, and combinations thereof, in a reactor at a pressure that is at least atmospheric pressure in the presence of a catalyst component under conditions sufficient to depolymerize the polyethylene terephthalate component into a first molten mixture containing components selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, covalently bonded oligomeric moieties containing at least two of the foregoing moieties, ethylene glycol, propylene glycol and combinations thereof;

(b) adding 1,4-butanediol to the first molten mixture in a reactor in the presence of a catalyst component, under conditions that are sufficient to form a second molten mixture containing a component selected from the group consisting of oligomers containing butylene terephthalate moieties, ethylene terephthalate moieties, oligomers containing trimethylene terephthalate moieties, propylene glycol, ethylene glycol, 1,4-butanediol, and combinations thereof; and (c) subjecting the second molten mixture to subatmospheric conditions and agitation sufficient to form a copolyetherester;

wherein polyalkylene oxide is added during the process in an amount and under conditions that are sufficient to form the copolyetherester; and wherein the oligomers containing trimethylene terephthalate moieties, ethylene terephthalate moieties, butylene terephthalate moieties, 1,4-butanediol, propylene glycol, and ethylene glycol are removed during formation of the copolyetherester.

In another embodiment, our invention relates to a composition comprising a modified, random copolyetherester containing:

(a) a modified, random polybutylene terephthalate copolymer block that is derived from a polyethylene terephthalate component selected from the group consisting of polyethylene terephthalate and polyethylene terephthalate copolymers and combinations thereof; and contains at least one residue derived from the polyethylene terephthalate component; and (b) a polyalkylene oxide copolymer block that is derived from a polyethylene terephthalate component and polyalkylene oxide glycol, and contains polyalkylene oxide and at least one residue derived from the polyethylene terephthalate component;

wherein the composition has a modulus of elasticity that is at least 80%, as compared to the modulus of elasticity of a copolyetherester derived from (1) polybutylene terephthalate derived from a monomer component selected from the group consisting of terephthalic acid, isophthalic acid, alkyl esters of terephthalic acid, hydroalkyl esters of terephthalic acid, alkyl esters of isophthalic acid, 1,4-butanediol, (2) polyalkylene oxide glycol, and (3) combinations thereof;

wherein the at least one residue derived from the polyethylene terephthalate component in the polyalkylene oxide copolymer block is selected from the group consisting of terephthalic acid groups, isophthalic acid groups, and combinations thereof.

wherein the at least one residue derived from the polyethylene terephthalate component in the modified, random polybutylene terephthalate copolymer block is selected from the group consisting ethylene glycol groups, diethylene glycol groups, isophthalic acid groups, 1,3-cyclohexyldimethanol isomers, 1,4-cyclohexyldimethanol isomers, the cis isomer of 1,3-cyclohexyldimethanol, the cis isomer of 1,4-cyclohexyldimethanol, the 1,3-trans isomer of cyclohexyldimethanol, terephthalic acid groups, the 1,4-trans isomer of 1,4-cyclohexyldimethanol, naphthalene dicarboxylic acids, 1,3-propane diol groups, and combinations thereof;

wherein the copolyetherester contains at least one residue derived from the polyethylene terephthalate component is selected from the group consisting of alkaline earth metal salts, alkali salts, phosphorous-containing compounds and anions, sulfur-containing compounds and anions, antimony-containing compounds, germanium-containing compounds, titanium-containing compounds, cobalt-containing compounds, tin containing compounds, aluminum, aluminum salts, and combinations thereof;

wherein the composition has from 20 to 95 wt % of the modified, polybutylene terephthalate random copolymer block, based on 100 wt % of total composition of the copolyetherester;

wherein the residue derived from the polyethylene terephthalate component further comprises isophthalic acid groups in an amount ranging from 0 to 35 mole %, based on 100 mole % of acid in the polybutylene terephthalate random copolymer; and wherein the composition imparts to an article molded or extruded from the composition a tensile modulus of elasticity ranging from 20 MPa to 1200 MPa, a melt transition temperature ranging from 145° C. to 230° C., a hardness ranging from 25 to 80 Shore D, and a Vicat temperature ranging from 45 ° C. to 200° C.

In another embodiment, our invention relates to a composition comprising:

(a) a modified, random polytrimethylene terephthalate copolymer block that is derived from a polyethylene terephthalate component selected from the group consisting of polyethylene terephthalate and polyethylene terephthalate copolymers and combinations thereof; and contains at least one residue derived from the polyethylene terephthalate component; and (b) a polyalkylene oxide copolymer block that is derived from a polyethylene terephthalate component and polyalkylene oxide glycol, and contains polyalkylene oxide and at least one residue derived from the polyethylene terephthalate component.

In another embodiment, our invention relates to a process for making the copolyetherester containing the polytrimethylene terephthalate copolymer block by a process that involves:

(a) depolymerizing, a polyethylene terephthalate component selected from the group consisting of polyethylene terephthalate and polyethylene terephthalate copolymers by agitating the polyethylene terephthalate component with member selected from the group consisting of ethylene glycol, 1,3 propane diol, and combinations thereof, in a reactor at a pressure that is at least atmospheric pressure in the presence of a catalyst component under conditions sufficient to depolymerize the polyethylene terephthalate component into a first molten mixture containing components selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, covalently bonded oligomeric moieties containing at least two of the foregoing moieties, ethylene glycol, propylene glycol and combinations thereof (b) adding 1,3-propane diol to the first molten mixture in a reactor in the presence of a catalyst component, under conditions that are sufficient to form a second molten mixture containing a component selected from the group consisting of oligomers containing, ethylene terephthalate moieties, oligomers containing trimethylene terephthalate moieties, propylene glycol, ethylene glycol, and combinations thereof; and (c) subjecting the second molten mixture to subatmospheric conditions and agitation sufficient to form the copolyetherester of a composition;

wherein polyalkylene oxide is added during the process in an amount and under conditions that are sufficient to form the copolyetherester; and wherein the oligomers containing trimethylene terephthalate moieties, ethylene terephthalate moieties, propylene glycol, and ethylene glycol are removed during formation of the copolyetherester.

In another embodiment, the invention relates to a method of forming any of our copolyetherester compositions by melt blending the components of any of the compositions of our invention. In another embodiment, the invention relates to a methods of forming an article, comprising shaping, extruding, blow molding, or injection molding any of the compositions of our invention. And our invention includes articles made by any of our copolyetheresters.

These and other features, aspects, and advantages of the present invention will become better understood with reference to the following description and appended claims.

DETAILED DESCRIPTION OF THE INVENTION

The invention is based on the discovery that it is now possible to make copolyetheresters derived from scrap polyethylene terephthalate that exhibit outstanding performance properties. Unlike conventional copolyetheresters compositions that are derived from monomers, the copolyetheresters of the invention contain residues derived from polyethylene terephthalate, e.g., ethylene glycol, isophthalic acid, and diethylene glycol groups. Despite this, the copolyetheresters impart excellent performance properties and can be used in many applications. Advantageously, the copolyetheresters retain at least 80% or more of their physical properties as compared to copolyetheresters derived from monomers. Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

All molecular weights in this application refer to weight average molecular weights, unless specifically stated otherwise. All such mentioned molecular weights are expressed in daltons.

All ASTM tests and data are from the 2003 edition of the Annual Book of ASTM Standards unless otherwise indicated.

For the sake of clarity, unless otherwise stated, the terms terephthalic acid group, isophthalic acid group, butanediol group, ethylene glycol group in formulas have the following meanings The term "terephthalic acid group" (R') in a composition refers to a divalent 1,4-benzene radical (-1,4-

(C₆H₄)—) remaining after removal of the carboxylic groups from terephthalic acid. The term "isophthalic acid group" (R") refers to a divalent 1,3-benzene radical (-(-1,3-C₆H₄)—) remaining after removal of the carboxylic groups from isophthalic acid. The "butanediol group" (D) refers to a divalent butylene radical (—(C₄H₈)—) remaining after removal of hydroxyl groups from butanediol. The term "ethylene glycol group" (D') refers to a divalent ethylene radical (—(C₂H₄)—) remaining after removal of hydroxyl groups from ethylene glycol. With respect to the terms "isophthalic acid group," "ethylene glycol group," and "diethylene glycol group" being used in other contexts, e.g., to indicate the weight % of the group in a composition, the term "isophthalic acid group(s)" means the group having the formula (—O(CO)C₆H₄(CO)—), the term "terephthalic acid group(s)" means the group having the formula (—O(CO)C₆H₄(CO)—), the term diethylene glycol group means the group having (—O(C₂H₄)O(C₂H₄)—), the term "butanediol group(s)" means the group having the formula (—O(C₄H₈)—), and the term "ethylene glycol groups(s)" means the group having formula (—O(C₂H₄)—). The term "propane diol group" means the group having the formula (—O(C₃H₆)—). The invention relates to a composition comprising a copolyetherester containing:

(A) a modified, random polybutylene terephthalate copolymer block that is derived from a polyethylene terephthalate component selected from the group consisting of polyethylene terephthalate and polyethylene terephthalate copolymers and combinations thereof; and contains at least one residue derived from the polyethylene terephthalate component; and (B) a polyalkylene oxide copolymer block and derived from a polyethylene terephthalate component and polyalkylene oxide glycol containing polyalkylene oxide and at least one residue derived from the polyethylene terephthalate component;

such that the composition has a modulus of elasticity that is at least 80%, as compared to the modulus of elasticity of a copolyetherester that is derived from (1) polybutylene terephthalate derived from a monomer component selected from the group consisting of terephthalic acid, isophthalic acid, alkyl esters of terephthalic acid, alkyl esters of isophthalic acid, 1,4-butanediol, (2) polyalkylene oxide glycol, and (3) combinations thereof.

Conventional copolyetheresters are derived from a monomer component selected from the group consisting of terephthalic acid, isophthalic acid, alkyl esters of terephthalic acid, hydroalkyl esters of terephthalic acid, alkyl esters of isophthalic acid, (2) 1,4-butanediol, (3) polyalkylene oxide glycol, and (4) combinations thereof). Conventional copolyetheresters have a monomer-derived polybutylene terephthalate copolymer block instead of a modified, random polybutylene terephthalate copolymer block. Conventional copolyetheresters also have monomer-derived polyalkylene oxide copolymer block.

Our modified, random copolyetheresters (and articles made from the copolyetherester) exhibit a modulus of elasticity that is at least 80%, as compared to the modulus of elasticity of a conventional copolyetherester when the conventional copolyetherester (i) has a monomer-derived polyalkylene terephthalate block in an equivalent amount of the modified, random polyalkylene terephthalate copolymer block and (ii) a monomer-derived polyalkylene oxide copolymer block in an equivalent amount to that of the polyalkylene oxide copolymer block that is derived from the polyethylene terephthalate component, polyalkylene oxide glycol, and contains polyalkylene oxide and at least one residue derived from the polyethylene terephthalate component.

The residue derived from the polyethylene terephthalate component which is present in the modified, random copolyetherester can be selected from the group consisting of ethylene glycol groups, diethylene glycol groups, isophthalic acid groups, antimony-containing compounds, germanium-containing compounds, titanium-containing compounds, cobalt-containing compounds, tin containing compounds, aluminum, aluminum salts, 1,3-cyclohexyldimethanol isomers, 1,4-cyclohexyldimethanol isomers, the cis isomer of 1,3-cyclohexyldimethanol, the cis isomer of 1,4-cyclohexyldimethanol, the 1,3-trans isomer of cyclohexyldimethanol, terephthalic acid groups, the 1,4-trans isomer of 1,4-cyclohexyldimethanol, alkaline earth metal salts, alkali salts, e.g., including calcium, magnesium, sodium and potassium salts, phosphorous-containing compounds and anions, sulfur-containing compounds and anions, naphthalene dicarboxylic acids, 1,3-propane diol groups, and combinations thereof.

The invention can selectively impart certain residues derived from the polyethylene terephthalate component to the polyalkylene oxide copolymer block and the modified, random polybutylene terephthalate copolymer block. For instance, the residue derived from the polyethylene terephthalate component of the polyalkylene oxide copolymer block is selected from the group consisting of terephthalic acid groups, isophthalic acid groups, and combinations thereof. The residue derived from the polyethylene terephthalate component of the modified, random polybutylene terephthalate copolymer block can be selected from the group consisting ethylene glycol groups, diethylene glycol groups, isophthalic acid groups, 1,3-cyclohexyldimethanol isomers, 1,4-cyclohexyldimethanol isomers, the cis isomer of 1,3-cyclohexyldimethanol, the cis isomer of 1,4-cyclohexyldimethanol, the 1,3-trans isomer of cyclohexyldimethanol, terephthalic acid groups, the 1,4-trans isomer of 1,4-cyclohexyldimethanol, naphthalene dicarboxylic acids, 1,3-propane diol groups, and combinations thereof. The copolyetherester can contain a residue derived from the polyethylene terephthalate component selected from the group consisting of alkaline earth metal salts, alkali salts, e.g., including calcium, magnesium, sodium and potassium salts, phosphorous-containing compounds and anions, sulfur-containing compounds and anions, antimony-containing compounds, germanium-containing compounds, titanium-containing compounds, cobalt-containing compounds, tin containing compounds, aluminum, aluminum salts, and combinations thereof. The selective incorporation of residues provides modified copolyetheresters having useful properties, as further described below.

Depending on factors such as polyethylene terephthalate and polyethylene terephthalate copolymers, the residue can include various combinations. In one embodiment, for instance, the residue derived from the polyethylene terephthalate component comprises mixtures of ethylene glycol and diethylene glycol. Such mixtures can include additional materials, such as isophthalic acid. Such mixtures can also include the cis isomer of 1,3-cyclohexyldimethanol, cis isomer of 1,4-cyclohexyldimethanol, trans isomer of 1,3-cyclohexyldimethanol, trans isomer of 1,4-cyclohexyldimethanol and combinations thereof. In one embodiment, the residue derived from the polyethylene terephthalate component can selected from the group of cis isomer of 1,3-cyclohexyldimethanol, cis isomer of 1,4-cyclohexyldimethanol, the trans isomer of 1,3 cyclohexyldimethanol, trans isomer of 1,4 cyclohexyldimethanol and combinations thereof. In another embodiment, the residue derived from the polyethylene terephthalate component can be selected from the group consisting of ethylene glycol groups, diethylene glycol groups, isophthalic acid groups, cis isomer of 1,3-cyclohexyldimethanol, trans isomer of 1,3-cyclohexyldimethanol, cis isomer of 1,4-cyclohexyldimethanol, trans isomer of 1,4-cyclohexyldimethanol, and combinations thereof. In another embodiment, the residue derived from the polyethylene terephthalate component comprises mixtures of ethylene glycol, diethylene glycol, and cobalt-containing compounds, and combinations thereof. As above, in such mixtures, the at least one residue derived from the polyethylene terephthalate component further comprises isophthalic acid groups.

The molar amounts of the residue derived from the polyethylene terephthalate component can vary. In one embodiment, the residue selected from the polyethylene terephthalate component is selected from the group consisting of ethylene glycol groups, diethylene glycol groups, and cyclohexyldimethanol groups and is present in an amount ranging from 0.1 to 10 mole %, based on 100 mole % of glycol in the molding composition. In another embodiment, the residue derived from the polyethylene terephthalate component further comprises isophthalic acid groups in an amount ranging from 0 to 10 mole %, based on 100 mole % of acid functionality in the composition. The total amount of materials of the polyethylene terephthalate residue can vary. For instance, sometimes, mixtures can be in an amount ranging from 1.8 to 2.5 wt %, or from 0.5 to 2 wt %, or from 1 to 4 wt %. The diethylene glycol group can be present in an amount ranging from 0.1 to 10 mole %, based on 100 mole % of glycol the molding composition. The isophthalic acid group is present in an amount ranging from 0 to 35 mole %, or from 0.1 to 35 mole %, based on 100 mole % of acid in the molding composition. The amount of the polybutylene terephthalate random copolymer can vary. In one embodiment, the amount of the polybutylene terephthalate random copolymer ranges from 20 to 95 wt %, based on 100 wt % of total composition of the copolyetherester.

The PET component from which the modified polybutylene terephthalate random copolymer block is made can be in any form that can be used according to our invention. Generally, the PET component includes recycle (scrap) PET in flake, powder/chip, film, or pellet form. Before use, the PET is generally processed to remove impurities such as paper, adhesives, polyolefin, e.g., polypropylene, polyvinyl chloride (PVC), nylon, polylactic acid, and other contaminants. Also, the PET component can include PET that is not waste in flake, chip, or pellet form. As such, PET that would ordinarily be deposited in landfills can now be used productively and effectively. In one embodiment, PET component can also include other polyesters. The PET component can also include polyester copolymers. Examples of such materials include polyalkylene terephthalates that can be selected from polyethylene terephthalate, polycyclohexane terephthalate, copolyesters of terephthalate esters with comonomers containing cyclohexyl dimethanol and ethylene glycol, copolyesters of terephthalate acid with comonomers containing cyclohexyl dimethanol and ethylene glycol, polybutylene terephthalate, poly-xylylene terephthalate, polydianol terephthalates, polybutylene terephthalate, polytrimethylene terephthalate, polyester naphthalates, and combinations thereof.

The polyalkylene oxide can be selected from the group consisting of polyethylene oxide, polypropylene oxide, polybutylene oxide, and combinations thereof. The amounts will vary, depending on the process conditions, customer needs, and the like.

In one embodiment, the invention relates to a copolyetherester comprising:
(a) long-chain ester units having the formula:

such that G is the divalent polyalkylene oxide radical remaining after removal of the terminal hydroxyl groups from a poly(alkylene oxide) glycol having a number-average molecular weight of 200 to 5000, as measured by vapor pressure osmometry or nuclear magnetic spectroscopy; and R' is the divalent terephthalic radical remaining after removal of the carboxyl groups from a terephthalic dicarboxylic acid; and R" is a divalent isophthalic radical remaining after removal of the carboxyl groups from an isophthalic dicarboxylic acid; and
(b) short-chain ester units having units of the formula:

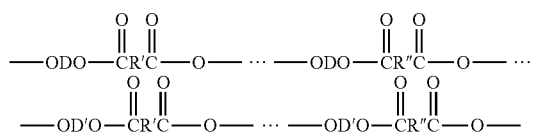

such that D is the divalent alkylene radical, selected from the group consisting of linear aliphatic radicals remaining after removal of the hydroxyl groups from aliphatic diols having a molecular weight ranging from 40 to 250; and R' and R" are as defined above; and D' is the divalent ethylene radical after removal of the hydroxyl groups of ethylene glycol.

The amounts of the short-chain ester units and the long-chain ester units and the amounts of the various groups can vary. For instance, the short-chain ester units can constitute from 20% to 95% by weight of the polyether-ester, and the long-chain ester units constitute from 5% to 80%, by weight of the copolyetherester. In one embodiment, D is present at 98 mol %, based on the total number of D and D' units.

The aliphatic radicals vary, pending on the application. Examples of suitable aliphatic radicals can be selected from the following: ethylene radicals, butylene radicals, trimethylene radicals, pentalene radicals, hexalene radicals, cyclohexylene radicals, and combinations thereof.

The invention provides copolyetheresters having specific useful relationships among the isophthalic groups, ethylene glycol groups, and the components of the copolyetherester. The invention provides embodiments in which the divalent alkylene radicals D and D' are in certain relationships with the divalent polyalkylene oxide radical G. In one embodiment, the divalent alkylene radical D and the divalent polyalkylene oxide radical G are at a weight ratio ranging from 95:5 to 20:80. In another embodiment, the divalent alkylene radical D' and the divalent polyalkylene oxide radical G are at a weight ratio ranging from 95:5 to 20:80.

The copolyetheresters of the invention impart physical properties that are useful in various applications. For instance, the intrinsic viscosity (IV) of the compositions can be at least 3. In one embodiment, the IV can range from 0.3 to 3.

The melting temperature of the copolyetherester of the invention is generally at least 120° C. In one embodiment, the melting temperature ranges from 120 to 225° C. The tensile elongation at break (%) imparted by a copolyetherester is generally at least 50%. In another embodiment, the tensile elongation at break (%) ranges from 50% to 700%. In one embodiment, the tensile elongation at break (%) ranges from 350% to 600%.

The molecular weight of the copolyetherester can also vary. In one embodiment, the molecular weight is at least 10,000. In another embodiment, the molecular weight can range from 10,000 to 800,000. The glass transition temperature of the amorphous polyether soft segments ranges from −100° C. to 50° C. In one embodiment, the glass transition temperature ranges from −60 to 10° C.

A copolyetherester composition of the invention is generally made by a process that involves: (a) reacting (i) a polyethylene terephthalate component with (ii) a diol, and (iii) a polyalkylene oxide at a pressure that is at least atmospheric pressure in the presence of a catalyst component at a temperature ranging from 180° to 230° C. The process is practiced under an inert atmosphere under conditions that depolymerizes the polyethylene terephthalate component into a molten mixture containing oligomers, polyalkylene oxide, alkylene diol, and ethylene glycol. The polyethylene terephthalate component and the diol are combined in the liquid phase under agitation and alkylene diol is refluxed back into a reactor during step (a).

The process further involves the step of subjecting the molten mixture to subatmospheric pressure and increasing the temperature of the molten mixture to a temperature ranging from 230° C. to 260° C., and thereby forming a copolyetherester.

The copolyetherester resin can include:
(a) long-chain ester units having the formula:

wherein G is the divalent polyalkylene oxide radical remaining after removal of the terminal hydroxyl groups from a poly(alkylene oxide) glycol having a number-average molecular weight of 200 to 5000, as measured by vapor pressure osmometry or nuclear magnetic spectroscopy; and R' is the divalent terephthalic radical remaining after removal of the carboxyl groups from a terephthalic dicarboxylic acid; and where R" is a divalent isophthalic radical remaining after removal of the carboxyl groups from an isophthalic dicarboxylic acid; and
(b) short-chain ester units having units of the formula:

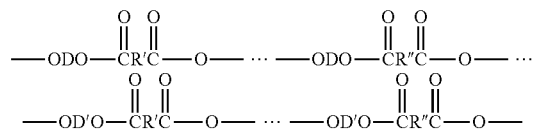

where D is the divalent alkylene radical, selected from the group consisting of linear aliphatic radicals remaining after removal of the hydroxyl groups from aliphatic diols having a molecular weight of less than 250; and R' and R" are as defined above; and where D' is the divalent ethylene radical after removal of the hydroxyl groups of ethylene glycol; and
  where excess diol, ethylene glycol, and THF are removed during step (b) and wherein step (b) is carried out under agitation.

The diol (D) used generally has a boiling point that is higher than the boiling point of ethylene glycol at atmospheric pressure. The diol can be selected from the group consisting of propane diol, 1,4 butanediol, cyclohexyldimethanol, pentane diol, hexane diol, isomers of the foregoing, and ethylene glycol, and combinations thereof. In one embodiment, however, the diol is ethylene glycol.

The polyalkylene oxide can be selected from the following materials: polyethylene oxide, polypropylene oxide, polyalkylene oxide, and combinations thereof.

Both steps of the process can be carried out in the same reactor. In one embodiment, however, the process is carried out in two separate reactors, where step (a) is carried out in a first reactor and when the molten mixture has formed, the molten mixture is placed in a second reactor and step (b) is carried out. In another embodiment, the process can be carried out in more than two reactors. In another embodiment, the process can be carried out in a continuous series of reactors.

Advantageously, the process can be carried out without isolation and dissolution of a material from the molten mixture.

The molar ratio at which the diol and the PET are added can vary, depending on application. In one embodiment, the butanediol:PET unit are at a molar ratio ranging from 0.1:1 to 4:1. In another embodiment, when the diol is 1,4-butanediol and the butanediol:PET unit are at a molar ratio ranging from 0.2:1 to 3:1.

The catalyst component is generally selected from group of antimony compounds, tin compounds, titanium compounds, and combinations thereof. Of course, functionally equivalent materials can be used. The amounts of the catalyst can vary. In one embodiment, the catalyst is used in an amount ranging from 10 to 5000 ppm.

When 1,4 butanediol is used, the invention provides specific embodiments that help make the process perform effectively. For instance, when the diol is 1,4-butanediol, the process includes a condition in which 1,4-butanediol, ethylene glycol, and water are recirculated, and tetrahydrofuran is distilled during step (a) of the process.

When the diol used is 1,4-butanediol, the invention includes a step that reduces the amount of THF produced during the process by adding a basic compound containing an alkali metal to a reactor in step (a) and thereby reducing formation of THF. Such a compound can be selected from the following compounds: sodium alkoxides, sodium hydroxide, sodium acetate, sodium carbonate, sodium bicarbonates, potassium alkoxides, potassium hydroxide, potassium acetate, potassium carbonate, potassium bicarbonate lithium alkoxides, lithium hydroxide, lithium acetate, lithium carbonate, lithium bicarbonate, calcium alkoxides, calcium hydroxide, calcium acetate, calcium carbonate, calcium bicarbonates, magnesium alkoxides, magnesium hydroxide, magnesium acetate, magnesium carbonate, magnesium bicarbonates, aluminum alkoxides, aluminum hydroxide, aluminum acetate, aluminum carbonate, aluminum bicarbonates, and combinations thereof.

The basic compound can be added to a reactor at an amount ranging from 0.1 ppm to 50 ppm and the THF total amount is reduced at least 10%, as compared to a process that does not utilize the basic compound.

The duration of the process can vary, depending on the application and the needs. In one embodiment, step (a) is carried out from two to 5 hours. In another embodiment, can be carried out from 2 to 10 hours, or more.

The process must be carried out under agitative conditions. The term "agitative conditions" or "agitation" refers to subjecting the a polyethylene terephthalate component and the 1,4-butanediol or the molten mixture to conditions that involve physically mixing the polyethylene terephthalate component-1,4-butanediol or molten mixture under conditions that promote the depolymerization of the PET (when the agitative conditions are applied to polyethylene terephthalate component-1,4-butanediol and oligomers. The physical mixing can be accomplished by any suitable way. In one embodiment, a mixer containing rotating shaft and blades that are perpendicular to the shaft can be used.

The process may contain an additional step in which the copolyetherester formed from the molten mixture is subjected to solid-state polymerization. Solid-state polymerization generally involves subjecting the copolyetherester formed from the molten mixture to an inert atmosphere and heating to a temperature for a sufficient period of time to build the molecular weight of the copolyetherester. Generally, the temperature to which the copolyetherester is heated is below the melting point of the copolyetherester, e.g., from 5 to 60° C. below the melting point of the copolyetherester. In one embodiment, such a temperature may range from 150 to 210° C. Suitable periods of time during which the solid-state polymerization occurs may range from 2 to 20 hours, or longer, depending on the conditions and equipment. The solid-state polymerization is generally carried out under tumultuous conditions sufficient to promote further polymerization of the copolyetherester to a suitable molecular weight. Such tumultuous conditions may be created by subjecting the copolyetherester to tumbling, the pumping of inert gas into the system to promote fluidization of polymer particle, e.g., pellets, chips, flakes, powder, and the like. The solid-state polymerization can be carried out at atmospheric pressure and/or under reduced pressure, e.g. from 1 atmosphere to 1 mbar.

The copolyetherester can contain additional materials, depending on factors such as the preparation process. For instance, in one embodiment, the further includes a catalyst selected from the group consisting of tin, antimony, titanium catalysts, and combinations thereof.

In one embodiment, the composition is used with stabilizers. Suitable stabilizers include hindered phenols. Examples of such suitable stabilizers include 1,3,5-trimethyl-2,4,6-tris (3,5-di-t-butyl-4-hydroxybenzyl)benzene sold under the trademark IRGANOX™ 1330 by CIBA, or ETHANOX™ 330.

It will be appreciated, however, that different variations of the process are possible. In one embodiment, for instance, the process involves the steps of:

(a) depolymerizing a polyethylene terephthalate component selected from the group consisting of polyethylene terephthalate and polyethylene terephthalate copolymers by reacting the (i) polyethylene terephthalate component with (ii) 1,4-butanediol at a pressure that is at least atmospheric pressure in the presence of a catalyst component, under an inert atmosphere conditions sufficient to depolymerize the polyethylene terephthalate component into a molten mixture containing oligomers, 1,4-butanediol, ethylene glycol, and mixtures thereof; wherein the polyethylene terephthalate component and the diol are combined in the liquid phase under agitation and the diol is refluxed back into the reactor; and (b) agitating the molten mixture under subatmospheric pressure and removing excess diol, ethylene glycol, and tetrahydrofuran; wherein polyalkylene oxide is added during the process in an amount and under conditions that are sufficient to form the copolyetherester. Sometimes, the polyethylene terephthalate component ("PET Component") can be further depolymerized with a member selected from the group consisting of ethylene glycol, propane diol, and mixtures thereof.

The temperatures used in such a variation can vary. In this version, for instance, the polyethylene terephthalate can be depolymerized in various temperatures, e.g., a temperature ranging from 180° C. to 260° C. The temperature of the molten mixture is increased to a temperature ranging from 240° C. to 270° C.

The polyalkylene oxide can be added at various stages of the process. In one embodiment, the polyalkylene oxide is added during the depolymerization of the polyethylene terephthalate component. In another embodiment, the polyalkylene oxide is added during the agitation of the molten mixture under subatmospheric pressure.

Also, the process contains an advantageous version in which the 1,4-butanediol, polyalkylene oxide, 1,3-propane diol, and combinations thereof are derived from biomass, e.g., a cellulosic material or a grain such as corn or wheat. More particularly, 1,4-butanediol, polybutylene oxide, and combinations can be derived from 1,4 butane dicarboxylic acid that is derived from biomass.

The term "biomass" means living or dead biological matter that can be directly or subsequently converted to useful chemical substances that are ordinarily derived from non-renewable hydrocarbon sources. Biomass can include cellulosic materials, grains, starches derived from grains, fatty acids, plant based oils, as well as derivatives from these biomass examples. Examples of useful chemical substances include and are not limited to diols; diacids; monomers used to make diols or acids, e.g., succinic acid; monomers used to make polymers; and the like. Biomass based butanediol can be obtained from several sources. For instance, the following process can be used to obtain biomass-based 1,4-butanediol. Agriculture based biomass, such as corn, can be converted into succinic acid by a fermentation process that also consumes carbon dioxide. Such succinic acid is commercially available from several sources such as from Diversified Natural Products Inc. under the trade name "BioAmber™". This succinic acid can be easily converted into 1,4-butanediol by processes described in several published documents such as in U.S. Pat. No. 4,096,156, incorporated herein in its entirety. Bio-mass derived-1,4-butanediol can also be converted to tetrahydrofuran, and further converted to polytetrahydrofuran, also known as polybutylene oxide glycol. Another process that describes converting succinic acid into 1,4-butanediol is described in Life Cycles Engineering Guidelines, by Smith et al., as described in EPA publication EPA/600/R-1/101 (2001). The invention also encompasses a process for making the copolyetherester that involves:

(a) depolymerizing, a polyethylene terephthalate component selected from the group consisting of polyethylene terephthalate and polyethylene terephthalate copolymers by agitating the polyethylene terephthalate component with member selected from the group consisting of ethylene glycol, 1,3 propane diol, and combinations thereof, in a reactor at a pressure that is at least atmospheric pressure in the presence of a catalyst component under conditions sufficient to depolymerize the polyethylene terephthalate component into a first molten mixture containing components selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, covalently bonded oligomeric moieties containing at least two of the foregoing moieties, ethylene glycol, propylene glycol and combinations thereof (b) adding 1,4-butanediol to the first molten mixture in a reactor in the presence of a catalyst component, under conditions that are sufficient to form a second molten mixture containing a component selected from the group consisting of oligomers containing butylene terephthalate moieties, ethylene terephthalate moieties, oligomers containing trimethylene terephthalate moieties, propylene glycol, ethylene glycol, 1,4-butanediol, and combinations thereof; and (c) subjecting the second molten mixture to subatmospheric conditions and agitation sufficient to form the copolyetherester of a composition;

wherein the polyalkylene oxide is added during the process in an amount and under conditions that are sufficient to form the copolyetherester; and wherein the oligomers containing trimethylene terephthalate moieties, ethylene terephthalate moieties, butylene terephthalate moieties, 1,4-butanediol, propylene glycol, and ethylene glycol are removed during formation of the copolyetherester.

The embodiment can also include variations. For instance, temperatures used during the process can vary. The polyethylene terephthalate component, for instance, can be depolymerized at a temperature ranging from 190° to 250° C., under an inert atmosphere. Step (b) of this embodiment (where 1,4-butanediol is added to the first molten mixture) can be conducted at a temperature ranging from 190° to 240° C. During step (c) (where the second molten mixture is subjected to subatmospheric conditions and agitation sufficient to form the copolyetherester), the temperature can be increased to a temperature ranging from 240° to 260° C.

The polyalkylene oxide can be added at different stages of this embodiment. In one embodiment, the polyalkylene oxide is added during the depolymerization of the polyethylene terephthalate component. In another embodiment, the polyalkylene oxide is added during the agitation of the first molten mixture. In another embodiment, the polyalkylene oxide is added during the agitation of the second molten mixture. The amounts of the polyalkylene oxide can vary. In one embodiment, the polyalkylene oxide is present in an amount ranging from 5 to 80 wt % polyalkylene oxide, based on 100 wt % of total composition of the copolyetherester.

The member selected from the group consisting of 1,4-butanediol, polyalkylene oxide, and combinations thereof can be derived from biomass.

The polyalkylene oxide can be selected from the group consisting of polyethylene oxide, polypropylene oxide, polybutylene oxide, and combinations thereof. The amounts will vary, depending on the process conditions, customer needs, and the like.

As such, the invention provides a flexible system that enables the production of various copolyetheresters having highly useful properties. When the diol selected is ethylene glycol, for instance, the invention includes a copolyetherester resin that includes the following formula:

(a) long-chain ester units having the formula:

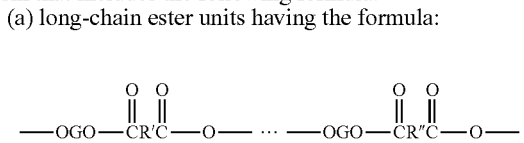

wherein G is the divalent polyalkylene oxide radical remaining after removal of the terminal hydroxyl groups from a poly(butylene oxide) glycol having a number-average molecular weight of 200 to 5000; and R' is the divalent terephthalic radical remaining after removal of the carboxyl groups from a terephthalic dicarboxylic acid; and R" is a divalent isophthalic radical remaining after removal of the carboxyl groups from an isophthalic dicarboxylic acid; and (b) short-chain ester units having the units

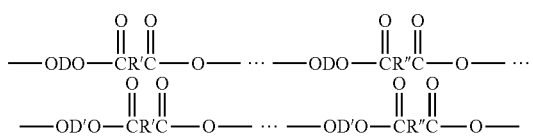

wherein D is the divalent butylene radical remaining after removal of the hydroxyl groups from butanediol having a molecular weight of less than 250, and D' is the divalent ethylene radical remaining after removal of the hydroxyl groups from ethylene glycol and R' and R" are as defined above.

When 1,4,-butanediol is selected, the invention offers a copolyetherester resin that includes:

(a) a long chain ester having the formula:

wherein G is the divalent polyalkylene oxide radical remaining after removal of the terminal hydroxyl groups from a poly(butylene oxide) glycol having a number-average molecular weight of 200 to 5000; and R' is the divalent terephthalic radical remaining after removal of the carboxyl groups from a terephthalic dicarboxylic acid; and R" is a divalent isophthalic radical remaining after removal of the carboxyl groups from an isophthalic dicarboxylic acid; and (b) short-chain ester units having the formula:

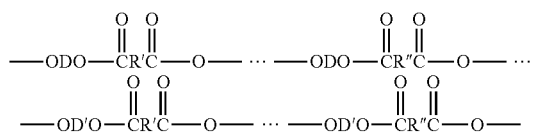

wherein D is the divalent butylene radical remaining after removal of the hydroxyl groups from butanediol having a molecular weight of less than 250; and R' and R" are as defined above; and wherein D' is a divalent ethylene radical after removal of hydroxyl groups of ethylene glycol.

Articles can be made from the copolyetheresters by molding or extrusion processes that are well known in the art. As such, in one embodiment, the invention relates to an article molded or extruded from compositions encompassed by the invention. In one embodiment, the invention relates to a method of forming a composition with improved heat stability and/or processing behavior, comprising melt blending the components of any of the compositions encompassed by our invention. In another embodiment, our invention encompasses a method of forming an article, comprising shaping, extruding, blow molding, or injection molding any of the compositions encompassed by our invention.

The copolyetheresters can impart useful properties to articles. The copolyetheresters, for instance, can impart one or more of the following properties to an article molded or extruded from the composition: (i) an impact resistance properties imparted by the molding composition of the invention is generally at least 100 J/m for notched Izod at room temperature, a tensile modulus of elasticity ranging from 20 MPa to 1200 MPa, a glass transitions temperature of the amorphous phase ranges from −80° C. to 10° C., a melt transition temperature ranging from 145° C. to 230° C., a flexural modulus ranging from 20 to 1200 MPa, a hardness ranging from 25 to 80 Shore D, and a heat deflection temperature ranges from 45° C. to 200° C. In another embodiment, our modified copolyetheresters can impart to an article molded or extruded from the composition a tensile modulus of elasticity ranging from 20 MPa to 1200 MPa, a melt transition temperature ranging from 145° C. to 230° C., a hardness ranging from 25 to 80 Shore D, and a Vicat temperature ranging from 45° C. to 200° C.

Although the modulus of elasticity of our copolyetheresters is at least 80%, as compared to the modulus of elasticity of a copolyetherester derived from (1) polybutylene terephthalate derived from a monomer component selected from the group consisting of terephthalic acid, isophthalic acid, alkyl esters of terephthalic acid, hydroalkyl esters of terephthalic acid, alkyl esters of isophthalic acid, 1,4-butanediol, (2) polyalkylene oxide glycol, and (3) combinations thereof; the modulus of elasticity of our copolyetheresters can vary. In one embodiment, a copolyetherester has a modulus of elasticity ranging from 80% to 120% as compared to the modulus of elasticity of a copolyetherester that is derived from (1) polybutylene terephthalate derived from a monomer component selected from the group consisting of terephthalic acid, isophthalic acid, alkyl esters of terephthalic acid, alkyl esters of isophthalic acid, 1,4-butanediol, (2) polyalkylene oxide glycol, and (3) combinations thereof. In another embodiment, our copolyetheresters exhibit a modulus of elasticity that is at least 90% as compared to the modulus of elasticity of a copolyetherester that is derived from (1) polybutylene terephthalate derived from a monomer component selected from the group consisting of terephthalic acid, isophthalic acid, alkyl esters of terephthalic acid, alkyl esters of isophthalic acid, 1,4-butanediol, (2) polyalkylene oxide glycol, and (3) combinations thereof.

The invention provides previously unavailable advantages. For instance, the invention provides copolyetheresters that have performance profiles that are competitive with ordinary copolyetheresters that are made from monomers, despite being based on a structurally different material containing isophthalic groups and ethylene glycol groups. Since the copolyetheresters are not based on monomers, the invention reduces the demand of raw materials and increases demand for the use of PET and thereby reduces the need to dispose PET scrap in landfills or by incineration.

Further, the process for making our elastomers can advantageously substantially reduce carbon dioxide emissions and solid waste. Since the PET-derived modified random copolyetheresters are made from scrap PET and not monomers, our process for making the elastomers significantly reduces the amount of carbon dioxide emissions and solid waste. Carbon waste reduction (or crude oil savings) occurs because the carbon that constitutes the dimethyl terephthalate or terephthalic acid ordinarily used to make elastomers is not used, rather a PET component, e.g., polyester scrap, is replaced. The process to make DMT or TPA from crude oil is highly energy intensive and as a result, substantial emissions of $CO_2$ to the atmosphere occur from burning of non-renewable energy sources. Additionally, when the source of BDO is derived from biomass feedstocks such as succinic acid, the carbon dioxide savings are further increased for two reasons. Bio derived succinic acid is made from sugars or other bio-derived hydrocarbons that originate from atmospheric carbon sources, thereby providing an advantage that is absent in ordinary monomer-based elastomers derived from fossil materials. Furthermore, the fermentation to yield succinic acid requires carbon dioxide as an input thus leading to further carbon dioxide reductions.

Although the invention has been directed to compositions comprising a modified, random copolyetherester containing the modified, random polybutylene terephthalate copolymer block and the polyalkylene oxide copolymer block, our contribution includes embodiments that include modified, random copolyetherester containing the (A) modified, random polytrimethylene terephthalate copolymer block and the polyalkylene oxide copolymer block.

More particularly, our invention includes copolyetheresters that contain (a) a modified, random polytrimethylene terephthalate copolymer block that is derived from a polyethylene terephthalate component selected from the group consisting of polyethylene terephthalate and polyethylene terephthalate copolymers and combinations thereof; and contains at least one residue derived from the polyethylene terephthalate component; and (b) a polyalkylene oxide copolymer block that is derived from a polyethylene terephthalate component and polyalkylene oxide glycol, and contains polyalkylene oxide and at least one residue derived from the polyethylene terephthalate component.

Our copolyetheresters containing the modified, random polytrimethylene terephthalate copolymer block contain residues derived from the polyethylene terephthalate component. For instance, the residues derived from the polyethylene terephthalate component of the polyalkylene oxide copolymer block of these materials can be selected from the group consisting of terephthalic acid groups, isophthalic acid groups, and combinations thereof. The residue derived from the polyethylene terephthalate component of the modified, random polytrimethylene terephthalate copolymer block can also be selected from the group consisting ethylene glycol groups, diethylene glycol groups, isophthalic acid groups, 1,3-cyclohexyldimethanol isomers, 1,4-cyclohexyldimethanol isomers, the cis isomer of 1,3-cyclohexyldimethanol, the cis isomer of 1,4-cyclohexyldimethanol, the 1,3-trans isomer of cyclohexyldimethanol, terephthalic acid groups, the 1,4-trans isomer of 1,4-cyclohexyldimethanol, naphthalene dicarboxylic acids, 1,3-propane diol groups, and combinations thereof. The copolyetherester can also contain at least one residue selected from the group consisting of alkaline earth metal salts, alkali salts, phosphorous-containing compounds and anions, sulfur-containing compounds and anions, antimony-containing compounds, germanium-containing compounds, titanium-containing compounds, cobalt-containing compounds, tin containing compounds, aluminum, aluminum salts, and combinations thereof.

Further, our copolyetheresters that contain polytrimethylene terephthalate copolymer blocks can include methods for forming an article, by shaping, extruding, blow molding, or injection molding any of our compositions to form an article.

Also, methods for forming such compositions can include the steps of melt blending the components of any of our compositions. Articles made from such compositions are also within the scope of our invention.

Processes for making copolyetheresters containing modified, random polytrimethylene terephthalate copolymer block can include the steps of (a) depolymerizing, a polyethylene terephthalate component selected from the group consisting of polyethylene terephthalate and polyethylene terephthalate copolymers by agitating the polyethylene terephthalate component with member selected from the group consisting of ethylene glycol, 1,3 propane diol, and combinations thereof, in a reactor at a pressure that is at least atmospheric pressure in the presence of a catalyst component under conditions sufficient to depolymerize the polyethylene terephthalate component into a first molten mixture containing components selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, covalently bonded oligomeric moieties containing at least two of the foregoing moieties, ethylene glycol, propylene glycol and combinations thereof;

(b) adding 1,3-propane diol to the first molten mixture in a reactor in the presence of a catalyst component, under conditions that are sufficient to form a second molten mixture containing a component selected from the group consisting of oligomers containing, ethylene terephthalate moieties, oligomers containing trimethylene terephthalate moieties, propylene glycol, ethylene glycol, and combinations thereof; and (c) subjecting the second molten mixture to subatmospheric conditions and agitation sufficient to form a copolyetherester; wherein the polyalkylene oxide is added during the process in an amount and under conditions that are sufficient to form the copolyetherester; and wherein the oligomers containing trimethylene terephthalate moieties, ethylene terephthalate moieties, propylene glycol, and ethylene glycol are removed during formation of the copolyetherester.

The polyethylene terephthalate component in such a process can be depolymerized at a temperature ranging from 190° to 250° C., under an inert atmosphere. Step (b) of the process can be conducted at a temperature ranging from 190° to 240° C. The temperature during step (c) of the process can range from 240 to 260° C.

The polyalkylene oxide can be added during the depolymerization of the polyethylene terephthalate component. Alternatively, the polyalkylene oxide is added during the agitation of the first molten mixture. In another embodiment, the polyalkylene oxide is added during the agitation of the second molten mixture.

As with the process that produce the modified, random polybutylene terephthalate copolymer blocks, processes for making compositions containing modified, random polytrimethylene terephthalate copolymer blocks can use 1,3-propane diol, polyalkylene oxide, and combinations thereof is derived from biomass. The biomass can be selected from the group consisting cellulosic materials and/or a grain selected from the group consisting of corn, wheat, and combinations thereof. 1,3-propanediol, polypropylene oxide, and combinations can be derived from biomass.

The invention is further described in the following illustrative examples in which all parts and percentages are by weight unless otherwise indicated.

EXAMPLES

Examples 1-5 Comparative Examples 1-5

Purpose/Overview

These examples illustrate procedure and versatility of the process described in making useful copolyetheresters (TPEE elastomers) from PET scrap. These examples demonstrate that materials produced via this method exhibit comparable thermomechanical properties of TPEE elastomers produced wholly from virgin monomer reactants.

Materials

Recycle PET was obtained from a commercial vendor from India.

Polytetrahydrofuran, pTHF, with Mn of 1000 and 2000 g/mol, respectively, was purchased from BASF and was used without further purification. Tetra iso-propyl titanate (TPT) was used as the esterification catalyst at 125 ppm was purchased from Sigma-Aldrich (St. Louis, Mo.). Dimethyl isophthalate was obtained from Sigma Aldrich (St. Louis, Mo.) and was used without further purification.

Preparation Process/Techniques

Synthesis of TPEE elastomers was carried out at in a pilot scale 'helicone' reactor. The helicone reactor has a capacity of 40 liters and is equipped with a special design of twin opposing helical blades with 270 degree twist; constructed of 316 SS with 16 g polish finish. The blade speed can be varied from 1 to 65 rpm. The agitators were connected to a 7.5 HP Constant Torque Inverter Duty Motor, which operates at 230/460 VAC, 3 PH, and 60 Hz. The helicone is also designed with an overhead condenser to condense the vapors in the glycolysis, transesterification (if any) and polymerization stages. A nitrogen purge and a two-stage vacuum were available to regulate the pressure of the helicone reactor.

Reactants for the synthesis of the TPEE elastomer were charged to the heated reactor under agitation. The reaction mixture was refluxed for 2-3 hours before going to the polymerization stage. For the polymerization stage, a vacuum was applied to the helicone reactor and the reflux of butanediol to the reactor was discontinued. The speed of the agitator was set to 60% of max and the target amps of the motor were 3.5 amps. The logic for changes in agitator speed as the molecular weight of the polymer increases is shown in Table 2. The system pressure was reduced to 0.5 Torr by the vacuum blower and the temperature of the reactor was raised to 250° C. at 2° C./min. The reaction was carried out under dynamic vacuum until the polymer reached its third build. The reaction was stopped and the polymer was cast in blobs. The blobs were then allowed to cool before they were granulated. The granulated polymer was injection molded into test parts (articles) for evaluation of mechanical properties.

TABLE 2

Logic for Agitator Speed vs. Polymer MW Buildup

| Stage | Build | Agitator Speed | Target Amp | Rpm |
|---|---|---|---|---|
| Ester Interchange | N/A | 66.7% | N/A | 34 |
| Polymerization | $1^{st}$ | 60% | 3.5 | 32 |
| | $2^{nd}$ | 30% | 3.8 | 16 |
| | $3^{rd}$ | 18% | 4.5 | 9 |

Analytical Techniques/Procedures

Intrinsic Viscosity (IV) data were collected on a Viscotek relative viscometer Y501C equipped with an autosampler and two Microlab 500 series pumps. A sample of ~0.2 g was weighed on an analytical balance and dissolved in ~35 ml of 60/40% Phenol/TCE (1,1,2,2-Tetrachloroethane) mixture. Each sample was measured twice and an average of the two measurements was recorded. A blank containing Phenol/TCE was run in the beginning of the series. At the end of the series, a phenol/TCE wash was run to clean the system.

Relative molecular weights of the TPEE elastomers were determined by Gel Permeation Chromatography (GPC). The system used consisted of a Waters 2695 Alliance Separations Module equipped with a Polymer Laboratories HFIPgel guard column (50×4.6 mm) and two Polymer Laboratories HFIPgel separations columns (250×4.6 mm). The columns were maintained at 35° C. A Waters 2487 Dual Wavelength Absorbance Detector, monitoring at 273 nm, was used to measure the concentration and the eluted samples. The mobile phase consisted of 95% chloroform (Sigma Aldrich, St. Louis, Mo.) and 5% hexafluoroisopropanol (HFIP) (Sigma Aldrich, St. Louis, Mo.). The mobile phase was delivered at 0.3 ml/min. Samples were prepared at 4 mg/ml and allowed to dissolve for at least 24 hours at room temperature prior to filtering with a 0.44 micron syringe filter directly into sampling vials. Ten microliters of each sample was injected per chromatograph and thirty minutes was allowed for complete elution of samples. Polystyrene GPC standards (Polymer Laboratories, Amherst, Mass.) with peak molecular weights ranging from 0.820 to 1860 kg/mol.

A Perkin Elmer Pyris 6 Differential Scanning Calorimeter (DSC) was used to determine melting temperature (Tm) and crystallization temperature (Tc) of the TPEE elastomers. Samples were loaded at 50° C. and subjected to the heating to 230° C. at 20° C./min, held for one minute at this temperature then cooled at 20° C./min to −60° C., whereupon the sample was heated to 230° C. at 20° C./min followed by cooling to −60° C. at 20° C./min. The first heating cycle was intended to impart a common thermal history to the samples, and measured properties were determined from the second heating cycle of the sample material. Endo- or exothermic peaks were integrated to determine the heats of melting and crystallization and the minima or maxima of these peaks were taken as the melting or crystallization temperatures.

A Thermal Analysis (TA) 2980 Dynamic Mechanical Analyzer (DMA) V1.7B was used to determine storage and loss modulus over a range of temperatures between 0 and 200° C. The TPEE materials were injection molded into samples with nominal dimensions of 35.00×12.5×3.15 mm. These samples were mounted in three point bending flexure testing mode and cooled to the starting temperature. The samples were stressed at 1 Hz while heated at 3° C./min. The dynamic test was carried out in strain control mode, with the displacement in the range of 5-20 micrometers.

Chemical composition of the TPEE elastomers was determined with NMR Spectroscopy. A Varian Mercury NMR spectrometer (400 MHz) was utilized for these measurements. Samples were dissolved in $CDCl_3$/TFA-D (7:3 v/v) between 40 and 50 mg/ml.

A Zwick Duromatic Durometer was used to measure Shore D hardness of the TPEE elastomer materials. Measurements were taken based on timed imprints (5 seconds) on the molded parts.

The Vicat softening temperature (Vicat) was measured according to the standard ISO306 test method. The sample was subject to 10N and the heating rate for the test was 50° C./hour.

Tensile performance data were measured according to ASTM D638 for Low-Modulus materials. This test method is used to determine the tensile properties of low-modulus plastic, ASTM Type I, dumbbell-shaped bars. The test has an initial speed of 1 inch per minute and after 50% strain increases to two inches per minute. The test runs until the sample breaks or the extensometer reaches its extension limit. Modulus of Elasticity, Stress at 5% Strain, Stress at 10% Strain, Stress at Maximum Strain, and Maximum Strain were reported.

Results/Discussion

Table 3 contains the details of TPEE Elastomer examples 1-8 of the present invention.

TABLE 3

Examples of PBT/pTHF TPEE elastomers produced from PET scrap.

| | | | E1 | E2 | E3 | E4 | E5 | E6 | E7 | E8 |
|---|---|---|---|---|---|---|---|---|---|---|
| Reactants | BDO Ratio | | 2 | 2 | 3 | 2 | 2 | 3 | 3 | 3 |
| | PET Weight | kg | 5.31 | 17.38 | 6.11 | 8.78 | 6.14 | 42.86 | 42.86 | 30.21 |
| | DMI Weight | kg | 0.95 | 0 | 1.53 | 0 | 0 | 0 | 0 | 0 |
| | BDO Weight | kg | 5.9 | 15.68 | 9.4 | 7.72 | 4.46 | 58.0 | 59.96 | 36.33 |
| | pTHF Weight | kg | 1.68 | 7 | 5.64 | 6.5 | 7.23 | 16.05 | 6.17 | 48.54 |
| | TPT Quantity | ml | 8 | 15 | 12 | 12 | 11 | 60 | 60 | 54 |
| DSC Data | Melting Point | ° C. | 180 | 206 | 155 | 203 | 169 | 205 | 213 | 193 |
| | Crystallization Temp | ° C. | 126 | 163 | 80 | 143 | 116 | 158 | 169 | 140 |
| | $\Delta H_{fusion}$ | ° C. | 19 | 22 | 12 | 14 | 7 | 25.5 | 28.8 | 12 |
| | $\Delta H_{crystallization}$ | kJ/kg | −25 | −30 | −18 | −20 | −14 | −35 | −40 | −20 |
| GPC Data | Mw/Mn | kg/mol | 101/49 | 96/54 | | 120/68 | 119/59 | | | |
| Viscosity | IV | dl/g | 1.323 | | | | 1.41 | 1.15 | 1.10 | 1.29 |
| Hardness | Shore D | | 54 | 54 | 40 | 43 | 37 | 52 | 65 | 30 |
| Softening point | Vicat | (C.) | 158 | 186 | 121 | | 124 | | | 105 |
| NMR Data | pTHF segment Mn | g/mol | 1000 | 1000 | 1000 | 2000 | 1000 | 1000 | 1000 | 2000 |
| | THF Repeat Unit | wt % | 20 | 27 | 40 | 40 | 54 | 27 | 12 | 62 |
| | EG Repeat Unit | wt % | 0.6 | 0.9 | 0.2 | 0.8 | 0.1 | 0.5 | 0.9 | 0.1 |
| | EDO Repeat Unit | wt % | 25 | 22 | 18 | 18 | 13 | 23 | 28 | 9 |
| | Isophthalic Repeat Unit | wt % | 9.2 | 0 | 8.2 | 0.9 | 0.7 | 1.0 | 1.0 | 0.6 |
| | Terephthalic Repeat Unit | wt % | 46 | 50 | 34 | 41 | 32 | 49 | 59 | 28 |
| Tensile Data | Modulus of Elasticity | MPa (std) | 251 (2) | 317 (7) | 85 (1) | 149 (5) | 68 (1) | 294 (2) | 1044 (9) | 35 (1) |
| | Stress at 5% Strain | MPa (std) | 8.4 (0.1) | 10.3 (0.1) | 3.5 (0.1) | 5.4 (0.1) | 2.9 (0.1) | 10.4 (0.1) | 22.0 (0.1) | 1.7 (0.1) |
| | Stress at 10% Strain | MPa (std) | 11.7 (0.1) | 14.4 (0.1) | 5.4 (0.1) | 7.8 (0.1) | 4.7 (0.1) | 14.6 (0.1) | 27.0 (0.1) | 2.9 (0.1) |
| | Stress at Max Strain | MPa (std) | 19.7 (0.1) | 21.8 (0.2) | 10.8 (0.1) | 11.3 (0.1) | 10.3 (0.1) | | 41 (1.7) | |
| | Max Strain | % (std) | 278 (1.1) | 291 (5.7) | 310 (3.3) | 316.6 (0.1) | 330 (2.2) | | 388 (1) | |

The reactant amounts as well as the results of the chemical, thermal, and mechanical evaluations were tabulated. The TPEE elastomer examples listed are representative, but not comprehensive, of the range of properties that can be produced by this invention. The thermal and mechanical properties of the TPEE elastomers were varied by manipulating the equivalent reactant concentrations.

The examples show that our invention can make modified copolyetheresters that impart useful properties to article molded or extruded from the composition, notably a tensile modulus of elasticity ranging from 20 to 1200 MPa, a melt transition temperature ranging from 145 to 230° C., a hardness ranging from 25 to 80 Shore D, and a Vicat temperature ranging from 45 to 200° C.

In all examples the TPEE elastomers consisted of high molecular weight polymer as evidenced by the intrinsic viscosity and GPC data. Melting temperatures of the example materials ranged from 155 to 215° C. The different compositions of the example materials resulted in materials with a range of hardness from 30 to 65 Shore D. In examples E1 and E2 NMR data reveals the presence of small but significant residual concentration of PET segments in the polymer. The presence of small concentration of PET segments in the polymer product is a consequence of the process of this invention. Additionally the concentration of isophthalate based monomers in the recycled PET flake results in residual isophthalate in the TPEE elastomer examples 3 and 4. In example 2 the particular grade of isophthalate free recycle PET flake was used. The composition of examples E1 and E3 include dimethyl isophthalate. These examples demonstrate the ease with which the PET flake can be directly copolymerized with non-recycled monomers. Copolymerization of the recycled PET scrape was carried out with poly(tetrahydrofuran) glycol with Mn 1000 and Mn 2000 g/mol molecular weight. The process of this invention can be easily extended to other poly(alkylene ether) glycols. The molecular weight of the poly(alkylene ether) glycol is not limited to the examples shown, and may include materials with number average molecular weights from 200 to 5000 g/mol. Comparative examples for these materials are listed in Table 4.

The comparative materials were obtained from the commercially available TPEE elastomers manufactured by the Dupont Company and DSM. The HYTREL® and ARNITEL® grades represent a sampling of the materials commercially available that utilize the PBT/pTHF copolymer chemistry. The comparison of Example 2 and HYTREL 6356 reveals that these materials exist as substantially similar Shore D hardness, melting temperatures, and modulus of elasticity. In addition, while both materials exhibit similar levels of crystallinity, evidenced by their similar Heat of crystallization, the difference between the melting and crystallization temperatures are 43 and 58° C. for the material of example 2 and HYTREL 6356, respectively. The decrease in the temperature difference indicates a more rapid rate of crystallization of the PBT phase and may result in improved processability due to reduced cycle times during injection molding.

These results indicate that the TPEE elastomers that were made exhibited highly useful properties. The TPEE elastomers produced via our method resulted in similar thermal/mechanical properties to TPEE elastomers produced from virgin monomers. The TPEE elastomers exhibited a modulus of elasticity that is at least 80%, as compared to the modulus of elasticity of TPEE elastomers made from virgin monomers (those derived from (1) polybutylene terephthalate derived from a monomer component selected from the group consisting of terephthalic acid, isophthalic acid, alkyl esters of terephthalic acid, hydroalkyl esters of terephthalic acid, alkyl esters of isophthalic acid, 1,4-butanediol, (2) polyalkylene oxide glycol, and (3) combinations thereof.

Examples 9-13

These examples show polytrimethylene terephthalate (PTT) elastomers being made. Green colored recycle PET pellets were obtained from St. Jude, a supplier in North America and clear recycle PET pellets were obtained from a supplier in India. The poly(tetrahydrofuran) (pTHF) was obtained from BASF and had a nominal molecular weight of 1000 g/mol. The post consumer recycle PET pellets had an IV specification of 0.68 to 0.78 and a melting temperature specification of 245 to 255° C. The 1,3-propanediol (PDO) was

TABLE 4

Comparative examples of commercially available TPEE elastomers with PBT/pTHF chemistry.

| | | | CE1 Hytrel® 4056 | CE2 Hytrel® 4556 | CE3 Hytrel® 6356 | CE4 Arnitel® EL630 | CE5 Arnitel® EM400 |
|---|---|---|---|---|---|---|---|
| DSC Data | Melting Point | ° C. | 150 | 193 | | | |
| | Crystallization Temp | ° C. | 63 | 124 | | | |
| | $\Delta H_{fusion}$ | ° C. | 11 | 10 | | | |
| | $\Delta H_{crystallization}$ | kJ/kg | −14 | −20 | −28 | −31 | −12 |
| GPC Data | Mw/Mn | kg/mol | 131/62 | 125/52 | 111/49 | 96/49 | 102/49 |
| Viscosity | iv | dl/g | 1.46 | 1.46 | 1.22 | 1.19 | 1.41 |
| Hardness | Shore D | | 36 | 42 | 55 | 56 | 33 |
| Softening point | Vicat | ° C. | 110 | 158 | 196 | 198 | 134 |
| NMR Data | pTHF segment Mn | g/mol | 1000 | 1000 | 1000 | 1000 | 2000 |
| | THF Repeat Unit | wt % | 44.9 | 49.9 | 26.8 | 24.5 | 59.6 |
| | EG Repeat Unit | wt % | 0.0 | 0.0 | 0.0 | 0.0 | 0.0 |
| | BDO Repeat Unit | wt % | 16.1 | 15.2 | 23.0 | 24.0 | 12.0 |
| | Isophthalic Repeat Unit | wt % | 8.4 | 0.0 | 0.0 | 0.0 | 0.0 |
| | Terephthalic Repeat Unit | wt % | 30.6 | 34.9 | 50.2 | 51.4 | 28.4 |
| Tensile Data | Modulus of Elasticity | MPa (std) | 66 (1.1) | 85 (0.7) | 324 (6.6) | 389 (4.4) | 49 (0.4) |
| | Stress at 5% Strain | MPa (std) | 2.8 (0.1) | 3.6 (0.1) | 11.1 (0.2) | 12 (0.1) | 2.2 (0.1) |
| | Stress at 10% Strain | MPa (std) | 4.5 (0.1) | 4.5 (0.1) | 15.7 (0.2) | 16.6 (0.1) | 3.6 (0.1) |
| | Stress at Max Strain | MPa (std) | 9.6 (0.1) | 13.1 (0.1) | 25.8 (0.2) | 25.1 (0.2) | 9.9 (0.1) |
| | Max Strain | % (std) | 287 (5.5) | 303 (1.1) | 311 (2) | 284 (0.3) | 310 (1.5) | obtained from Shell Chemicals and had a purity specification of >99.9 wt. %. The TPT catalyst was commercial Tyzor grade available from Dupont.

Example 9

44.67 grams of green colored recycle PET pellets were mixed with 35 grams of 1,3-propanediol and 50 grams of pTHF (molar ratio of reactive end groups 1:2:0.2) in a 500 ml reaction kettle. The temperature of the oil bath (for the reaction kettle) was ramped up from 180 to 255° C. The agitator speed was set at 20 rpm. At this stage, 0.07 ml of TPT catalyst was also added to the reaction mix. The reaction mass achieved a temperature of 214° C. (boiling point of 1,3-propanediol) and the PDO was refluxed at this temperature for 2 hours. This is referred to as the PET glycolysis stage.

For the poly stage, the reflux condenser was removed and a vacuum was applied to the reaction kettle. The excess diol and other volatile fractions were collected in a 'Dean and Stark' condenser. The speed of the agitator was increased to 220 rpm. A vacuum pump was used to reduce the pressure at 40 Torr/min to 0.15 Ton. The increase in molecular weight of the polymer mass was monitored by the increase in torque of the overhead stirrer. Upon reaching a maximum torque value for the agitator, the stir rate was reduced and the reaction was allowed to proceed. This polymerization stage was completed after three successive maximum torque reading were attained at 220, 120 and 60 rpm. About 10 grams of the polymer was collected from the reaction kettle for further testing and analysis. The following tests were conducted on the polymer sample: intrinsic viscosity (IV), NMR analysis and DSC analysis. NMR analysis of the resin confirmed the composition of the material to consist of 37 mol % PTT and 3 mol % residual PET and 60 mol % of the pTHF. The intrinsic viscosity of the material was 0.557 dl/g. The melting and crystallization temperatures, measured by DSC (heating rate of 20° C./min), were 170° C. and 71° C. The heat of fusion and crystallization for these transitions was 10.8 and −11.3 J/g, respectively.

Example 10

126.48 g of recycle PET pellets were mixed with 120 g of PDO and 15.52 g of pTHF 1000 in a 500 ml 3 neck round bottom flask with the common set up for the ester interchange portion of a melt polymerization (mechanical overhead stirrer and Dean-Starke apparatus). The temperature of the oil bath (for the reaction flask) was 225° C. At this stage, 0.17 ml of TPT catalyst was added to the reaction mixture. The oil bath was held at this temperature for 2 hours. The agitator speed was set at 20 rpm and later increased to 260 rpm when the reaction was homogeneous. This is known as the PET glycolysis stage. After 2 hours, the oil bath temperature was then increased to 250° C. for 1 hour to further drive off any ethylene glycol liberated and to remove most of the excess PDO.

For the poly stage, the Dean-Starke apparatus was removed and a vacuum was applied to the reaction flask. The pressure was reduced at 40 Torr/min to below one Torr. The excess PDO and other volatile fractions were removed. The increase in molecular weight of the polymer mass was monitored by the increase in torque of the overhead stirrer. Upon reaching a set torque value for the agitator, the stir rate was reduced and the reaction was allowed to proceed. A sample of the polymer was collected from the reaction flask for analysis. Intrinsic viscosity (IV) and DSC measurements were performed on the sample. The intrinsic viscosity of the material was 0.96 dl/g. The melting and crystallization temperatures were 216° C. and 129° C. The heat of fusion and crystallization for these transitions were 38.1 and −41.4 J/g, respectively.

Example 11

126.48 g of recycle PET pellets were mixed with 150 g of PDO and 16.62 g of pTHF 1000 in a 500 ml 3 neck round bottom flask with the common set up for the ester interchange portion of a melt polymerization (mechanical overhead stirrer and Dean-Starke apparatus). The temperature of the oil bath (for the reaction flask) was 225° C. At this stage, 0.17 ml of TPT catalyst was added to the reaction mixture. The oil bath was held at this temperature for 2 hours. The agitator speed was set at 20 rpm and later increased to 260 rpm when the reaction was homogeneous. This is known as the PET glycolysis stage. After 2 hours, the oil bath temperature was then increased to 250° C. for 1 hour to further drive off any ethylene glycol liberated and to remove most of the excess PDO.

For the poly stage, the Dean-Starke apparatus was removed and a vacuum was applied to the reaction flask. The pressure was reduced at 40 Torr/min to below 1 Torr. The excess PDO and other volatile fractions were removed. The increase in molecular weight of the polymer mass was monitored by the increase in torque of the overhead stirrer. Upon reaching a set torque value for the agitator, the stir rate was reduced and the reaction was allowed to proceed. A sample of the polymer was collected from the reaction flask for analysis. Intrinsic viscosity (IV) and DSC measurements were performed on the sample. The intrinsic viscosity of the material was 1.01 dug. The melting and crystallization temperatures were 216° C. and 135° C. The heat of fusion and crystallization for these transitions were 47.7 and −41.3 J/g, respectively.

Example 12

90.36 g of recycle PET pellets were mixed with 150 g of PDO and 68.47 g of pTHF 1000 in a 500 ml 3 neck round bottom flask with the common set up for the ester interchange portion of a melt polymerization (mechanical overhead stirrer and Dean-Starke apparatus). The temperature of the oil bath (for the reaction flask) was 225° C. At this stage, 0.17 ml of TPT catalyst was added to the reaction mixture. The oil bath was held at this temperature for 2 hours. The agitator speed was set at 20 rpm and later increased to 260 rpm when the reaction was homogeneous. This is known as the PET glycolysis stage. After 2 hours, the oil bath temperature was then increased to 250° C. for 1 hour to further drive off any ethylene glycol liberated and to remove most of the excess PDO.

For the poly stage, the Dean-Starke apparatus was removed and a vacuum was applied to the reaction flask. The pressure was reduced at 40 Torr/min to below 1 Torr. The excess PDO and other volatile fractions were removed. The increase in molecular weight of the polymer mass was monitored by the increase in torque of the overhead stirrer. Upon reaching a set torque value for the agitator, the stir rate was reduced and the reaction was allowed to proceed. A sample of the polymer was collected from the reaction flask for analysis. Intrinsic viscosity (IV) and DSC measurements were performed on the sample. The intrinsic viscosity of the material was 1.25 dl/g. The melting and crystallization temperatures were 196° C. and 102° C. The heat of fusion and crystallization for these transitions were 24.6 and −26.4 J/g, respectively.

Example 13

54.08 g of recycle PET pellets were mixed with 48 g of PDO and 121.2 g of pTHF 1000 in a 500 ml 3 neck round bottom flask with the common set up for the ester interchange portion of a melt polymerization (mechanical overhead stirrer and Dean-Starke apparatus). The temperature of the oil bath (for the reaction flask) was 225° C. At this stage, 0.17 ml of TPT catalyst was added to the reaction mixture. The oil bath was held at this temperature for 2 hours. The agitator speed was set at 20 rpm and later increased to 260 rpm when the reaction was homogeneous. This is known as the PET glycolysis stage. After 2 hours, the oil bath temperature was then increased to 250° C. for 1 hour to further drive off any ethylene glycol liberated and to remove most of the excess PDO.

For the poly stage, the Dean-Starke apparatus was removed and a vacuum was applied to the reaction flask. The pressure was reduced at 40 Torr/min to below 1 Torr. The excess PDO and other volatile fractions were removed. The increase in molecular weight of the polymer mass was monitored by the increase in torque of the overhead stirrer. Upon reaching a set torque value for the agitator, the stir rate was reduced and the reaction was allowed to proceed. A sample of the polymer was collected from the reaction flask for analysis. Intrinsic viscosity (IV) and DSC measurements were performed on the sample. The intrinsic viscosity of the material was 1.45 dl/g. The intrinsic viscosity of the material was 1.45 dl/g. The melting temperature was 2.7° C. The heat of fusion was 5.4 J/g, respectively Examples 14-16

Materials

| COMPONENT | CHEMICAL DESCRIPTION | SOURCE, VENDOR |
|---|---|---|
| Recycled PET | Polyethylene terephthalate obtained from scrap PET bottles for recycle | Futura, India |
| Bio-Succinic acid | 1,4-butane dicarboxylic acid derived from corn sugar | Diversified Natural Products |
| Triisopropyl ortho titanate (TPT) | Triisopropyl ortho titanate (TPT) | Aldrich, USA |
| Commercial pTHF | Poly tetra hydro furan | Aldrich, USA |
| Bio pTHF | Poly tetra hydro furan derived from bio BDO | Prepared from bio BDO |
| Ethylene Glycol | 1,2-dihydroxy Ethane | Merck |

This example shows a copolyetherester being made from biomass-derived 1,4-butanediol. PET (recycle) 4.8 g (25 mmol), ethylene glycol 3.87 g (62.4 mmol) were added to a reactor and heated to 180° C. under nitrogen atmosphere. At 180° C., the catalyst triisopropylorthotitanate (TPT) 200 ppm was added and heating was continued to 225-230° C. and kept for 90 minutes. 3.37 g (37.44 mmol) of 1,4-butanediol(BDO) derived from bio succinic acid and 1.65 g pTHF was added to the reaction mass and continued the reaction for another 20 minutes with distilling off ethylene glycol methanol, THF and butanediol from the reaction. Vacuum was applied in a stepwise manner starting from 700 mbar to 500, 300, 100, 75, 50, 25, 10, 5.5, 1.5 and finally to less than 1.0 mbar. The molten reaction mass was kept at 0.7 to 0.5 mbar for 30 minutes and finally the polymer was drained off the reactor under nitrogen pressure.

The polyester thus obtained had an IV of 0.70 dL/g, melting temperature ($T_m$) 182.05° C. and glass transition temperature ($T_g$) −28° C. The polyester had a weight average molecular weight ($M_w$) of 50702 and a number average molecular weight ($M_n$) of 10175 (Mw/Mn=4.98).

Example 14

This Example shows a copolyetherester made from recycled PET, biomass-derived BDO and biomass derived pTHF:

PET (recycle) 3.49 g (18.17 mmol), ethylene glycol 2.82 g (45.48 mmol) were added to a reactor and heated to 180° C. under nitrogen atmosphere. At 180° C., the catalyst triisopropylorthotitanate (TPT) 200 ppm was added and heating was continued to 225-230° C. and kept for 90 minutes. 2.45 g (27.22 mmol) of 1,4-butanediol (BDO) derived from bio Succinic acid and 1.20 g bio-pTHF derived from bio BDO were added to the reaction mass and continued the reaction for another 20 minutes with distilling off ethylene glycol, methanol, THF and butanediol from the reaction. Vacuum was applied in a stepwise manner starting from 700 mbar to 500, 300, 100, 75, 50, 25, 10, 5.5, 1.5 and finally to less than 1.0 mbar. The molten reaction mass was kept at 0.7 to 0.5 mbar for 30 minutes and finally the polymer was drained off the reactor under nitrogen pressure.

The polyester thus obtained had an IV of 0.74 dL/g, melting temperature ($T_m$) of 197° C. And glass transition temperature ($T_g$) of −20° C. The polyester had a weight average molecular weight ($M_w$) of 60855 and a number average molecular weight ($M_n$) of 12514 (Mw/Mn=4.86)

Example 15

This example shows biomass-derived THF being made from biomass-derived BDO. Bio BDO (60 g) (synthesized from Bio Succinic acid) and o-Phosphoric acid (6 g) were placed in a round-bottomed flask fitted with a distillation set-up and provided with a magnetic stirrer. The reaction mass was heated to 170-175° C. using an oil bath. The splitting off of water starts at about 165° C. and a mixture of tetrahydrofuran with water starts distilling. About 56 g of this mixture is collected in the distillate (about 20% water). This mixture was subjected to $CaCl_2$ treatment to remove water and dried further by refluxing in metallic sodium to remove moisture traces to obtain dried biomass-derived THF.

Example 16

This example shows biomass-derived pTHF being made. Dried biomass derived THF (20 g) (synthesized from Bio BDO) and fluorosulfonic acid (3.6 g) were placed in a round-bottomed flask and stirred for 3 hrs at 35° C. At the end of 3 hours the reaction temperature was cooled to around 5° C. using an ice-bath. The stirring was continued further for an hour. The reaction was quenched using 50 ml water at the end of 4 hrs from the start of the reaction. The reaction mass was neutralized using 3.5% Na₂CO₃ solution. The unreacted THF was stripped off this mixture under vacuum and the resulting solution was extracted using toluene. The separated toluene layer was dried using sodium sulfate and evaporated the toluene to obtain Bio pTHF, which was used in further polymerizations.

Although the present invention has been described in detail with reference to certain preferred versions thereof, other variations are possible. Therefore, the spirit and scope of the appended claims should not be limited to the description of the versions contained therein.

What is claimed is:

1. A composition comprising a modified, random copolyetherester containing:
   (a) a modified, random polytrimethylene terephthalate copolymer block that is derived from 1,3-propane diol and a polyethylene terephthalate component selected from the group consisting of polyethylene terephthalate and polyethylene terephthalate copolymers and combinations thereof, and contains at least one residue derived from the polyethylene terephthalate component; and
   (b) a polyalkylene oxide copolymer block that is derived from a polyethylene terephthalate component and polybutylene oxide glycol, and that contains polybutylene oxide and at least one residue derived from the polyethylene terephthalate component;
   wherein the at least one residue derived from the polyethylene terephthalate component comprises a diethylene glycol group in an amount ranging from 0.1 to 10 mole %, based on 100 mole % of glycol in the composition; and
   wherein the composition has a modulus of elasticity that is at least 80%, as compared to the modulus of elasticity of a copolyetherester derived from (1) polytrimethylene terephthalate derived from a monomer component selected from the group consisting of terephthalic acid, isophthalic acid, alkyl esters of terephthalic acid, hydroalkyl esters of terephthalic acid, alkyl esters of isophthalic acid, and 1,3-propane diol, (2) polybutylene oxide glycol, and (3) combinations thereof.

2. The composition of claim 1, wherein the at least one residue derived from the polyethylene terephthalate component further comprises a residue selected from the group consisting of terephthalic acid groups, isophthalic acid groups, and combinations thereof.

3. The composition of claim 1, wherein the at least one residue derived from the polyethylene terephthalate component further comprises a residue selected from the group consisting ethylene glycol groups, terephthalic acid groups, isophthalic acid groups, 1,3-cyclohexyldimethanol isomers, 1,4-cyclohexyldimethanol isomers, the cis isomer of 1,3-cyclohexyldimethanol, the cis isomer of 1,4-cyclohexyldimethanol, the trans isomer of 1,3-cyclohexyldimethanol, the trans isomer of 1,4-cyclohexyldimethanol, naphthalene dicarboxylic acid groups, 1,3-propane diol groups, and combinations thereof.

4. The composition of claim 1, wherein the copolyetherester contains at least one residue selected from the group consisting of alkaline earth metal salts, alkali metal salts, phosphorous-containing compounds and anions, sulfur-containing compounds and anions, antimony-containing compounds, germanium-containing compounds, titanium-containing compounds, cobalt-containing compounds, tin-containing compounds, aluminum, aluminum salts, and combinations thereof.

5. The composition of claim 1, wherein the composition has from 5 to 80 wt % polybutylene oxide, based on 100 wt % of total composition of the copolyetherester.

6. The composition of claim 1, wherein the residue derived from the polyethylene terephthalate component further comprises mixtures of terephthalic acid and ethylene glycol.

7. The composition of claim 6, wherein the residue derived from the polyethylene terephthalate component further comprises isophthalic acid.

8. The composition of claim 6, wherein the residue derived from the polyethylene terephthalate component further comprises the cis isomer of 1, 3-cyclohexyldimethanol, the cis isomer of 1,4-cyclohexyldimethanol, the trans isomer of 1,3-cyclohexyldimethanol, the trans isomer of 1,4-cyclohexyldimethanol, and combinations thereof.

9. The composition of claim 1, wherein the residue derived from the polyethylene terephthalate component further comprises a residue selected from the group consisting of the cis isomer of 1,3-cyclohexyldimethanol, the cis isomer of 1,4-cyclohexyldimethanol, the trans isomer of 1,3-cyclohexyldimethanol, the trans isomer of 1,4-cyclohexyldimethanol, and combinations thereof.

10. The composition of claim 6, wherein the residue derived from the polyethylene terephthalate component further comprises a residue selected from the group consisting of isophthalic acid groups, the cis isomer of 1,3-cyclohexyldimethanol, the trans isomer of 1,3-cyclohexyldimethanol, the cis isomer of 1,4-cyclohexyldimethanol, the trans isomer of 1,4-cyclohexyldimethanol, and combinations thereof.

11. The composition of claim 1, wherein the at least one residue derived from the polyethylene terephthalate component comprises mixtures of ethylene glycol and diethylene glycol.

12. The composition of claim 11, wherein the at least one residue derived from the polyethylene terephthalate component further comprises isophthalic acid groups.

13. The composition of claim 1, wherein the residue derived from the polyethylene terephthalate component comprises ethylene glycol groups, diethylene glycol groups, and cyclohexyldimethanol groups, and is in an amount ranging from 0.1 to 10 mole %, based on 100 mole % of glycol in the composition.

14. The composition of claim 13, wherein the residue derived from the polyethylene terephthalate component further comprises isophthalic acid groups in an amount ranging from 0 to 35 mole %, based on 100 mole % of acid in the composition.

15. The composition of claim 1, wherein the copolyetherester has an intrinsic viscosity of 0.3 to 3 dL/g, a melting temperature of 120 ° C. to 225 ° C., and a molecular weight of at least 10,000, and wherein the glass transition temperature of the amorphous polyether soft segments ranges from −100 ° C. to 50 ° C.

16. The composition of claim 1, wherein the composition imparts to an article molded or extruded from the composition a tensile elongation at break of at least 50%.

17. The composition of claim 1, wherein the copolyetherester has
   (1) long-chain ester units having the formula:

wherein G is the divalent polybutylene oxide radical remaining after removal of the terminal hydroxyl groups from a polybutylene oxide glycol having a number-average molecular weight of 200 to 5000; and R' is the divalent terephthalic radical remaining after removal of the carboxyl groups from a terephthalic dicarboxylic acid; and R" is a divalent isophthalic radical remaining after removal of the carboxyl groups from an isophthalic dicarboxylic acid; and (2) short-chain ester units having the formula:

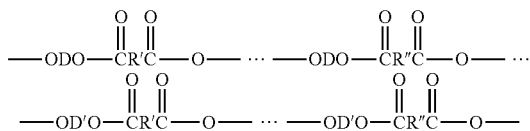

wherein D is the divalent trimethylene radical remaining after removal of the hydroxyl groups from 1,3-propane diol and R' and R" are as defined above; and wherein D' is the divalent radical remaining after removal of the hydroxyl groups from ethylene glycol and/or diethylene glycol.

18. The composition of claim 17, wherein the copolyetherester has from 20 to 95 wt % of short-chain ester units and from 5 to 80% of long-chain ester units, based on 100 wt % of total composition of the copolyetherester.

19. The composition of claim 1, wherein a member selected from the group consisting of 1,3-propane diol, polybutylene oxide glycol, and combinations thereof is derived from biomass.

20. The composition of claim 1, wherein the polybutylene oxide glycol is derived from 1,4-butane dicarboxylic acid that is derived from biomass.

21. The compositions of claims 19 or 20, wherein the biomass is selected from the group consisting of cellulosic materials and a grain selected from the group consisting of corn, wheat, and combinations thereof.

22. A process for making the copolyetherester of the composition of claim 1, the process comprising:

(a) depolymerizing, a polyethylene terephthalate component selected from the group consisting of polyethylene terephthalate and polyethylene terephthalate copolymers by agitating the polyethylene terephthalate component with a member selected from the group consisting of ethylene glycol, 1,3-propane diol, and combinations thereof, in a reactor at a pressure that is at least atmospheric pressure in the presence of a catalyst component under conditions sufficient to depolymerize the polyethylene terephthalate component into a first molten mixture containing components selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, covalently bonded oligomeric moieties containing at least two of the foregoing moieties, ethylene glycol, 1,3-propane diol and combinations thereof;

(b) adding 1,3-propane diol to the first molten mixture in a reactor in the presence of a catalyst component, under conditions that are sufficient to form a second molten mixture containing a component selected from the group consisting of oligomers containing ethylene terephthalate moieties, oligomers containing trimethylene terephthalate moieties, 1,3-propane diol, ethylene glycol, and combinations thereof; and (c) subjecting the second molten mixture to subatmospheric conditions and agitation sufficient to form the copolyetherester of the composition of claim 1;

wherein a polybutylene oxide glycol is added during the process in an amount and under conditions that are sufficient to form the copolyetherester.

23. The process of claim 22, wherein the polyethylene terephthalate component is depolymerized at a temperature ranging from 180 ° C. to 260 ° C.

24. The process of claim 22, wherein the temperature of the second molten mixture is increased to a temperature ranging from 240 ° C. to 270 ° C.

25. The process of claim 22, wherein the polybutylene oxide glycol is added during the depolymerization of the polyethylene terephthalate component.

26. The process of claim 22, wherein the polybutylene oxide glycol is added during the agitation of the second molten mixture under subatmospheric pressure.

27. The process of claim 22, wherein a member selected from the group consisting of 1,3-propane diol, polybutylene oxide glycol, and combinations thereof is derived from biomass.

28. The process of claim 22, wherein the polybutylene oxide glycol is derived from 1,4-butane dicarboxylic acid that is derived from biomass.

29. The processes of claims 27 or 28, wherein the biomass is selected from the group consisting of cellulosic materials and a grain selected from the group consisting of corn, wheat, and combinations thereof.

30. A process for making the copolyetherester of the composition of claim 1, the process comprising:

(a) depolymerizing a polyethylene terephthalate component selected from the group consisting of polyethylene terephthalate and polyethylene terephthalate copolymers by agitating the polyethylene terephthalate component with a member selected from the group consisting of ethylene glycol, 1,3-propane diol, and combinations thereof, in a reactor at a pressure that is at least atmospheric pressure in the presence of a catalyst component under conditions sufficient to depolymerize the polyethylene terephthalate component into a first molten mixture containing components selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, covalently bonded oligomeric moieties containing at least two of the foregoing moieties, ethylene glycol, 1,3-propane diol and combinations thereof;

(b) adding 1,3-propane diol to the first molten mixture in a reactor in the presence of a catalyst component, under conditions that are sufficient to form a second molten mixture containing a component selected from the group consisting of oligomers containing ethylene terephthalate moieties, oligomers containing trimethylene terephthalate moieties, 1,3-propane diol, ethylene glycol, and combinations thereof; and (c) subjecting the second molten mixture to subatmospheric conditions and agitation sufficient to form the copolyetherester of the composition of claim 1;

wherein a polybutylene oxide glycol is added during the process in an amount and under conditions that are sufficient to form the copolyetherester; and wherein the oligomers containing trimethylene terephthalate moieties, oligomers containing ethylene terephthalate moieties, 1,3-propane diol, and ethylene glycol are removed during formation of the copolyetherester.

31. The process of claim 30, wherein the polyethylene terephthalate component is depolymerized at a temperature ranging from 190° C. to 250° C., under an inert atmosphere.

32. The process of claim 30, wherein step (b) is conducted at a temperature ranging from 190° C. to 240° C.

33. The process of claim 30, wherein during step (c), the temperature is increased to a temperature ranging from 240° C. to 260° C.

34. The process of claim 30, wherein the polybutylene oxide glycol is added during the depolymerization of the polyethylene terephthalate component.

35. The process of claim 30, wherein the polybutylene oxide glycol is added during the agitation of the first molten mixture.

36. The process of claim 30, wherein the polybutylene oxide glycol is added during the agitation of the second molten mixture.

37. The process of claim 30, wherein a member selected from the group consisting of 1,3-propane diol, polybutylene oxide glycol, and combinations thereof is derived from biomass.

38. The process of claim 30, wherein the polybutylene oxide glycol is derived from 1,4-butane dicarboxylic acid that is derived from biomass.

39. The processes of claims 37 or 38, wherein the biomass is selected from the group consisting of cellulosic materials and a grain selected from the group consisting of corn, wheat, and combinations thereof.

40. A method of forming an article, comprising shaping, extruding, blow molding, or injection molding the composition of claim 1 to form an article.

41. An article comprising the composition of claim 1.

42. A method of forming a composition comprising melt blending the components of the composition of claim 1.

43. A composition comprising a modified, random copolyetherester containing:
  (a) a modified, random polytrimethylene terephthalate copolymer block that is derived from 1,3-propane diol and a polyethylene terephthalate component selected from the group consisting of polyethylene terephthalate and polyethylene terephthalate copolymers and combinations thereof, and that contains at least one residue derived from the polyethylene terephthalate component; and
  (b) a polyalkylene oxide copolymer block that is derived from a polyethylene terephthalate component and polybutylene oxide glycol, and that contains polybutylene oxide and at least one residue derived from the polyethylene terephthalate component;

wherein the copolyetherester has from 20 to 95 wt % of the modified, polytrimethylene terephthalate random copolymer block, based on 100 wt % copolyetherester;

wherein at least one residue derived from the polyethylene terephthalate component is selected from the group consisting of terephthalic acid groups, isophthalic acid groups, and combinations thereof;

wherein at least one residue derived from the polyethylene terephthalate component is selected from the group consisting of ethylene glycol groups, diethylene glycol groups, 1,3-cyclohexyldimethanol isomers, 1,4-cyclohexyldimethanol isomers, the cis isomer of 1,3-cyclohexyldimethanol, the cis isomer of 1,4-cyclohexyldimethanol, the trans isomer of 1,3-cyclohexyldimethanol, the trans isomer of 1,4-cyclohexyldimethanol, naphthalene dicarboxylic acids, 1,3-propane diol groups, and combinations thereof;

wherein at least one residue derived from the polyethylene terephthalate component is selected from the group consisting of alkaline earth metal salts, alkali salts, phosphorous-containing compounds and anions, sulfur-containing compounds and anions, antimony-containing compounds, germanium-containing compounds, titanium-containing compounds, cobalt-containing compounds, tin containing compounds, aluminum, aluminum salts, and combinations thereof;

wherein at least one residue derived from the polyethylene terephthalate component is selected from the group consisting of ethylene glycol groups, diethylene glycol groups, cyclohexyldimethanol groups, and combinations thereof, and is present in an amount ranging from 0.1 to 10 mole %, based on 100 mole % of glycol in the composition; and wherein at least one residue derived from the polyethylene terephthalate component comprises isophthalic acid groups in an amount ranging from 0 to 35 mole%, based on 100 mole% of acid in the polybutylene terephthalate random copolymer; and wherein the polyethylene terephthalate component comprises diethylene glycol groups in an amount ranging from 0.1 to 10 mole %, based on 100 mole % of glycol in the composition; and wherein the composition has a modulus of elasticity that is at least 80%, as compared to the modulus of elasticity of a copolyetherester derived from (1) polytrimethylene terephthalate derived from a monomer component selected from the group consisting of terephthalic acid, isophthalic acid, alkyl esters of terephthalic acid, hydroalkyl esters of terephthalic acid, alkyl esters of isophthalic acid, and 1,3-propane diol, (2) polybutylene oxide glycol, and (3) combinations thereof.

44. The composition of claim 43, wherein the copolyetherester has at least one of an intrinsic viscosity of 0.557 to 1.45 dL/g, a crystallization temperature of 71 to 102° C., a melting temperature of 196 to 216° C., a heat of crystallization of −41.4 to −11.3 J/g, and a heat of fusion of 10.8 to 47.7 J/g.

45. A method of forming an article, comprising shaping, extruding, blow molding, or injection molding the composition of claim 43 to form an article.

46. An article comprising the composition of claim 43.

47. A method of forming a composition comprising melt blending the components of the composition of claim 43.

48. The composition of claim 1, wherein the at least one residue derived from the polyethylene terephthalate component in the modified, random polytrimethylene terephthalate copolymer block comprises a diethylene glycol group in an amount ranging from 0.1 to 10 mole %, based on 100 mole % of glycol in the composition, and wherein the at least one residue derived from the polyethylene terephthalate component in the polyalkylene oxide copolymer block is selected from the group consisting of terephthalic acid groups, isophthalic acid groups, and combinations thereof.

* * * * *